US008516206B2

(12) United States Patent
Yoshida et al.

(10) Patent No.: US 8,516,206 B2
(45) Date of Patent: Aug. 20, 2013

(54) COMPUTER-READABLE MEDIUM STORING STORAGE CONTROL PROGRAM, STORAGE CONTROL METHOD, AND STORAGE CONTROL DEVICE

(75) Inventors: Masahiro Yoshida, Kawasaki (JP); Tadashi Matsumura, Kawasaki (JP); Kenji Uchiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 190 days.

(21) Appl. No.: 13/064,508

(22) Filed: Mar. 29, 2011

(65) Prior Publication Data

US 2011/0246730 A1    Oct. 6, 2011

(30) Foreign Application Priority Data

Apr. 6, 2010    (JP) .................................. 2010-087890

(51) Int. Cl.
*G06F 12/00*    (2006.01)
*G06F 13/00*    (2006.01)

(52) U.S. Cl.
USPC ............................. 711/158; 100/111; 100/154

(58) Field of Classification Search
USPC .......................... 711/100, 154, 158, 111, 114
See application file for complete search history.

(56) References Cited

U.S. PATENT DOCUMENTS

| 8,019,938 | B2 * | 9/2011 | Flynn et al. .................... | 711/113 |
| 8,117,387 | B2 * | 2/2012 | Matsuki et al. ................ | 711/114 |
| 8,135,900 | B2 * | 3/2012 | Kunimatsu et al. ............ | 711/103 |
| 8,171,215 | B2 * | 5/2012 | Ikawa et al. .................... | 711/114 |
| 8,285,952 | B2 * | 10/2012 | Arakawa et al. ............... | 711/158 |
| 8,285,963 | B2 * | 10/2012 | Asaki et al. .................... | 711/170 |
| 8,307,171 | B2 * | 11/2012 | Ogawa et al. .................. | 711/154 |
| 8,321,629 | B2 * | 11/2012 | Hayashi et al. ................ | 711/114 |

FOREIGN PATENT DOCUMENTS

| JP | 2008-052313 | 3/2008 |
| JP | 2009-163647 | 7/2009 |

OTHER PUBLICATIONS

Patent Abstracts of Japan, Publication No. 2009-163647, Published Jul. 23, 2009.
Patent Abstracts of Japan, Publication No. 2008-052313, Published Mar. 6, 2008.

* cited by examiner

*Primary Examiner* — Tuan Thai
(74) *Attorney, Agent, or Firm* — Staas & Halsey LLP

(57) ABSTRACT

A generation section periodically generates access frequency information for identifying an access frequency of each data item according to a status of write access of the data item transmitted from a host device to a storage device. Whenever access frequency information is generated by the generation section, a determination section determines whether to write data saved in a hard disk into the storage medium, or to hold a saved state of the data. A write section writes data into the storage device according to determination by the determination section.

9 Claims, 32 Drawing Sheets

116a ACCESS FREQUENCY MANAGEMENT TABLE

| Data1 | |
|---|---|
| TIME | ACCESS COUNT |
| 00:00:00 | 9 |
| 00:01:00 | 7 |
| 00:02:00 | 16 |
| ... | ... |
| 23:59:00 | 10 |

FIG. 6

117a SCHEDULE MANAGEMENT TABLE

| Data1 | | | |
|---|---|---|---|
| TIME | PRESENT OPERATIONAL RANK | TODAY OPERATIONAL RANK | RENEWAL OPERATIONAL RANK |
| 00:00:00-0030:00 | B | A | A |
| 00:30:00-01:00:00 | B | A | A |
| 01:00:00-01:30:00 | A | B | B |
| 01:30:00-02:00:00 | A | C | B |
| 02:00:00-02:30:00 | A | C | B |
| ... | ... | ... | ... |

PRESENT SCHEDULE — TODAY SCHEDULE — RENEWAL SCHEDULE

FIG. 8

117b SCHEDULE ADJUSTMENT MANAGEMENT TABLE

| (Feb, 1, 1st Week,) | RLU#0 | RLU#1 | RLU#2 | RLU#3 | RLU#4 |
|---|---|---|---|---|---|
| Time | OPERA-TIONAL RANK | OPERA-TIONAL RANK | OPERA-TIONAL RANK | OPERA-TIONAL RANK | OPERA-TIONAL RANK |
| 00:00:00-00:30:00 | A | D | A | B | C |
| 00:30:00-01:00:00 | A | D | A | B | C |
| 01:00:00-01:30:00 | A | D | A | A | B |
| 01:30:00-02:00:00 | A | D | A | A | B |
| ⋮ | ⋮ | ⋮ | ⋮ | ⋮ | ⋮ |

FIG. 9

118a RAID GROUP INFORMATION MANAGEMENT TABLE

| RLU No. | STATUS | DISK TYPE | LAST WRITE TIME | WRITE ACCESS RANK | TEMPORARY DATA FLAG | TEMPORARY RLU No. |
|---|---|---|---|---|---|---|
| RLU#0 | Available | SSD | 10/01/18 20:21:30 | A | On | 4 |
| RLU#1 | Available | SATA | 10/01/18 10:11:51 | C | – | – |
| RLU#2 | Available | FC/SAS | 10/01/18 20:16:38 | B | – | – |
| RLU#3 | Available | SSD | 10/01/15 06:43:29 | D | Off | – |
| RLU#4 | Available | FC/SAS | 10/01/18 19:57:45 | A | On | 0 |
| .. | .. | .. | .. | .. | .. | .. |

FIG. 10

118b SAVED DATA MANAGEMENT TABLE

| SAVE SOURCE RLU No. | SAVE DESTINATION RLU No. | START OFFSET | DATA SIZE | OFFSET | VALID FLAG |
|---|---|---|---|---|---|
| 0 | 4 | 0x00150000 | 0x00001000 | 0x00000000 | On |
| 0 | 4 | 0x11223300 | 0x00022000 | 0x00001000 | On |
| 0 | 4 | 0x00663300 | 0x00003600 | 0x00023000 | On |
| 0 | 4 | 0x00365400 | 0x00001010 | 0x00026600 | On |
| 0 | 4 | 0x00250010 | 0x00000100 | 0x00027610 | On |
| ⋮ | ⋮ | ⋮ | ⋮ | ⋮ | ⋮ |

FIG. 11

118b SAVED DATA MANAGEMENT TABLE

| SAVE SOURCE RLU No. | SAVE DESTINATION RLU No. | START OFFSET | DATA SIZE | OFFSET | VALID FLAG |
|---|---|---|---|---|---|
| 0 | 4 | 0x00150000 | 0x00001000 | 0x00000000 | On |
| 0 | 4 | 0x11223300 | 0x00022000 | 0x00001000 | On |
| 0 | 4 | 0x00663300 | 0x00003600 | 0x00023000 | On |
| ⋮ | ⋮ | ⋮ | ⋮ | ⋮ | ⋮ |

FIG. 12A

118b SAVED DATA MANAGEMENT TABLE

| SAVE SOURCE RLU No. | SAVE DESTINATION RLU No. | START OFFSET | DATA SIZE | OFFSET | VALID FLAG |
|---|---|---|---|---|---|
| – | 4 | – | 0x00001000 | 0x00000000 | Off |
| 0 | 4 | 0x11223300 | 0x00022000 | 0x00001000 | On |
| 0 | 4 | 0x00663300 | 0x00003600 | 0x00023000 | On |
| 0 | 4 | 0x00365400 | 0x00001010 | 0x00026600 | On |
| 0 | 4 | 0x00250010 | 0x00000100 | 0x00027610 | On |
| 0 | 4 | 0x00150000 | 0x00002000 | 0x00027710 | On |

FIG. 12B

| Data1 | |
|---|---|
| TIME | PRESENT OPERATIONAL RANK |
| 00:00:00-0030:00 | B |
| 00:30:00-01:00:00 | B |
| 01:00:00-01:30:00 | A |
| 01:30:00-02:00:00 | A |
| 02:00:00-02:30:00 | A |
| ... | ... |

SCHEDULE

FIG. 27

117c SCHEDULE ADJUSTMENT MANAGEMENT TABLE

| 2009/11/1 | Data1 | Data2 | Data3 | ... | Datan |
|---|---|---|---|---|---|
| TIME | OPERATIONAL RANK | OPERATIONAL RANK | OPERATIONAL RANK | ... | OPERATIONAL RANK |
| 00:00:00-0030:00 | B | A | D | ... | C |
| 00:30:00-01:00:00 | A | A | D | ... | C |
| 01:00:00-01:30:00 | A | B | D | ... | B |
| 01:30:00-02:00:00 | A | C | D | ... | A |
| ... | ... | ... | ... | ... | ... |

FIG. 29

COMPUTER-READABLE MEDIUM STORING STORAGE CONTROL PROGRAM, STORAGE CONTROL METHOD, AND STORAGE CONTROL DEVICE

CROSS-REFERENCE TO RELATED APPLICATION

This application is based upon and claims the benefit of priority of the prior Japanese Patent Application No. 2010-087890, filed on Apr. 6, 2010, the entire contents of which are incorporated herein by reference.

FIELD

The embodiments discussed herein are related to a computer-readable medium storing a storage control program, a storage control method, and a storage control device.

BACKGROUND

With computerization of business, regulations, and the like, there are increasing demands for storage media that store electronic mails and fully electronic documents and papers.

The storage media storing electronic data are predominantly configured to be capable of storing large-capacity data with quick responsiveness. As such storage media, hard disk drives (HDD) and the like are known.

Further, in addition to the hard disk drives and the like, with a view to reducing the electric power consumption of devices (storage devices) in which storage media are mounted, there are increasingly used SSD (solid state drives) that use semiconductor storage elements, such as flash memories, which can achieve increased write speed and reduced electric power consumption of disks.

It is known that the storage devices are constructed by taking redundancy into account (see Japanese Laid-Open Patent Publication No. 2008-52313). When the storage devices are constructed by taking redundancy into account, modules for controlling the storage devices, disks, and SSDs are made at least duplex.

See Japanese Laid-Open Patent Publication No. 2009-163647, and Japanese Laid-Open Patent Publication No. 2008-52313.

When a write access to an SSD occurs with high frequency, the SSD can reach an upper limit of the number of times of rewriting that can be executed, earlier than the hard disk drives, due to the structure of the semiconductor elements thereof.

Although the above description has been given of the SSDs, the other nonvolatile semiconductor memories also suffer from the same problems.

SUMMARY

According to an aspect of the invention, there is provided a non-transitory computer-readable medium storing a storage control program for causing a computer to execute generating access frequency information for identifying an access frequency of each data item transmitted from a host apparatus according to a status of write access of the data item to the storage medium, determining whether to write a data item saved in a saving area provided for saving data, into the storage medium, or to hold a state of the data item saved in the saving area, based on the generated access frequency information, and writing the data item saved in the saving area into the storage medium according to the determination.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 illustrates access frequency information;
FIG. 8 illustrates schedule management information;
FIG. 9 illustrates schedule adjustment and management information;
FIG. 10 illustrates RAID group information;
FIG. 11 illustrates saved data management information;
FIGS. 12A and 12B illustrate an example of update of a saved data management table;
FIG. 27 illustrates an example of a schedule set by a user;
FIG. 29 illustrates a schedule adjustment management table in which operational ranks are set on a data item-by-data item basis.

DESCRIPTION OF EMBODIMENTS

Figure 1:
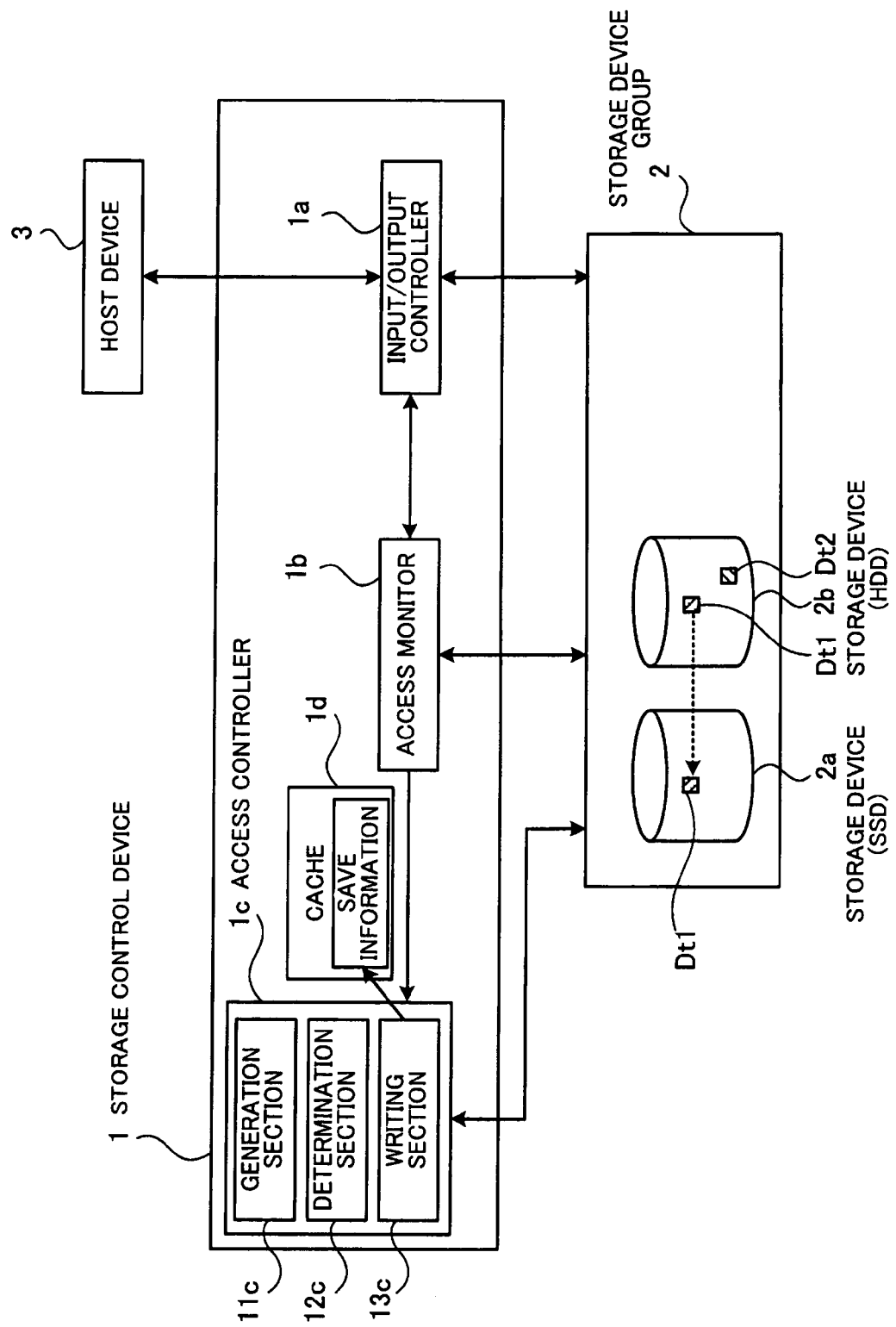
FIG. 1 is a general diagram of a storage control device according to a first embodiment.

Embodiments of the present invention will be explained below with reference to the accompanying drawings, wherein like reference numerals refer to like elements throughout.

First, a description will be given of a storage control device according to the embodiments, and then of more details of the embodiments.

(a) First Embodiment

FIG. 1 is a general diagram of the storage control device according to the first embodiment. The storage control device 1 is connected to a storage device group 2 and a host apparatus 3. The storage control device 1 performs access to the storage device group 2 based on an access request received from the host apparatus 3.

The host apparatus 3 reads information from the storage device group 2, or issues an access request for requesting writing of information into the storage device group 2, to the storage control device 1.

The storage device group 2 includes a plurality of storage devices 2a and 2b.

Further, in the storage device group 2, SSDs (solid state drives) and hard disk drives are arranged in a mixed manner. In the present embodiment, the storage device 2a includes an SSD, and the storage device 2b includes a hard disk drive.

Next, a description will be given of the storage control device 1. The storage control device 1 includes an input/output controller 1a, an access monitor 1b, an access controller 1c, and a cache 1d.

The input/output controller 1a receives an access request from the host apparatus 3, and reads information from the storage device group 2 or writes information into the storage device group 2, based on the received access request. Timing in which the input/output controller 1a reads the information from the storage device group 2 is controlled by the access monitor 1b. And timing in which the input/output controller 1a writes the information into the storage device group 2 is controlled by the access monitor 1b.

The access monitor 1b monitors the input/output controller 1a, and detects a logical volume which contains the information requested to be accessed by the host apparatus 3. The detection of the logical volume is performed e.g. by referring to a table in which write data requested to be accessed is associated with a logical volume containing the write data. Further, the access monitor 1b monitors the operating states of the respective storage devices 2a and 2b.

Furthermore, when the access monitor 1b detects the logical volume containing the write data requested to be accessed, the access monitor 1b checks the operating states of groups of storage devices (storage groups) forming the detected logical volume. When a corresponding one of the storage groups is in an in-operation state, the access monitor 1b causes the input/output controller 1a to perform reading or writing of the information.

The access controller 1c includes a generation section 11c, a determination section 12c, and a writing section 13c.

The generation section 11c generates access frequency information for identifying the frequency of access on a data item-by-data item basis according to the states of write access to the storage devices 2a and 2b for writing data transmitted from the host apparatus 3 into the storage devices 2a and 2b.

Although the access frequency information may be generated for identifying the frequency of access to both the storage devices 2a and 2b, in the present embodiment, it is generated for identifying the frequency of access to at least the storage device 2a including the SSD.

It is preferable that the access frequency information stepwise represents the total number of times of access to the storage device 2a for each predetermined time period. For example, it is possible to represent items of access frequency information, by a when the number of times of access is not smaller than 300 times per 30 minutes, by $\beta$ when the number of times of access is not smaller than 10 times and smaller than 300 times per 30 minutes, and by $\gamma$ when the number of times of access is smaller than 10 times for 30 minutes, respectively. These items of access frequency information are used as references for determining the magnitude of frequency of write access to the storage device. This makes it possible to simplify determination by the determination section 12c.

The determination section 12c determines based on the access frequency information generated by the generation section 11c whether to write a data item into the storage device 2a as a writing destination thereof or to write the data item in a save area provided for saving data.

It is preferable that the save area is disposed in a storage media other than the SSD. In the present embodiment, it is assumed that the save area is disposed in advance in the storage device 2b including the hard disk drive.

In the present embodiment, the data write destination can be determined, for example, by the following method:

When the above-mentioned access frequency information is $\alpha$, it is preferable to determine that the frequency of access to the storage device is relatively high, and hence data is to be written in an available area, in other words, a save area of the storage device 2b. FIG. 1 illustrates a state in which data items Dt1 and Dt2 are written in the available areas of the storage device 2b. This makes it possible to prevent data items from being written very frequently into the storage device 2a including the SSD to thereby prevent the storage device 2a from reaching an upper limit of the number of times of rewriting that can be executed, earlier than it ought to be. This makes it possible to enhance the reliability of data management.

In this case, to identify an area where data has been written, it is preferable that information for identifying a portion where the data has been written (saved data management information) is written in advance in the cache 1d, and the input/output controller 1a refers to the saved data management information when reading out the data to identify the portion where the data has been written and cause the data to be read out from the identified portion. This makes it possible to easily read out the data.

Further, when the above-described access frequency information is $\beta$, it is preferable to determine that data is to be written into the storage device 2a when the storage device 2a is not accessed for a predetermined time period, and otherwise save the data in the storage device 2b.

This makes it possible to prevent data from being written very frequently into the storage device 2a including the SSD to prevent the storage device 2a from reaching the upper limit of the number of times of rewriting that can be executed, earlier than it ought to be.

When the above-described access frequency information is $\gamma$, it is preferable to determine that the frequency of access to the storage device is relatively low, and hence data is to be written into the storage device 2a.

The writing section 13c writes data into the storage device 2a or the storage device 2b according to the determination by the determination section 12c.

After data items are written into the storage devices, the generation section 11c periodically generates access frequency information. As the timing for generating the access frequency information, there may be mentioned, in addition to the above, a time when the host apparatus 3 accesses the storage devices again, a time designated by a user, and a time set for periodical generation thereof in advance.

Whenever access frequency information is generated by the generation section 11c, the determination section 12c determines whether to write the data items Dt1 and Dt2 saved in the storage device 2b into the storage device 2a or to hold the state where the data items Dt1 and Dt2 are saved in the storage device 2b. This determination may be performed on a data item-by-data item basis or on a storage device-by-storage device basis. For example, when a data item which was saved in the storage device 2b and the access frequency information of which is β is not accessed for a half day, the data item saved in the storage device 2b is written into the storage device 2a. Further, when the storage device 2a is not accessed for a half day, a data item saved in the storage device 2b is written into the storage device 2a, by way of another example.

FIG. 1 illustrates processing carried out for the data item Dt1, which was saved in the storage device 2b and of which the immediately preceding access frequency information was α, when the access frequency information generated thereon again by the generation section 11c is γ. In this case, it is determined that the data item Dt1 saved in the storage device 2b is to be written into the storage device 2a. The writing section 13c writes the data item Dt1 saved in the storage device 2b into the storage device 2a.

Further, FIG. 1 illustrates processing carried out for the data item Dt2, which was saved in the storage device 2b and of which the immediately preceding access frequency information was α, when the access frequency information generated thereon again by the generation section 11c is α. In this case, it is determined that a state of the data item Dt2 saved in the storage device 2b is to be held. Further, in this case, the update of the data item Dt2 is executed in the storage device 2b.

According to the storage control device 1 of the present embodiment, the generation section 11c periodically generates access frequency information on the storage device 2a including the SSD, and whenever the access frequency information is generated, the determination section 12c determines whether to write data in the storage device 2a or to hold a state of the data saved in the storage device 2b. Specifically, when the frequency of access to the storage device 2a is high, the state of the data saved in the storage device 2b is held, whereas when the access frequency to the storage device 2a is low, the data is written into the storage device 2a.

As described above, by controlling the number of times of writing of data into the storage device 2a, it is possible to prevent an SSD from reaching the upper limit of the number of times of rewriting that can be executed, earlier than it ought to be. Further, by storing data the access frequency to which is low in the SSD, it is possible to enhance the read access performance. This makes it possible to realize a highly reliable apparatus.

The input/output controller 1a, the access monitor 1b, and the access controller 1c can be realized by functions of a CPU (central processing unit) of the storage control device 1. Further, the cache 1d can be realized by a function of a RAM (random access memory) or the like of the storage control device 1.

Although in the present embodiment, the storage device 2a including the SSD has been described as an example of the storage medium for saving data, this is not limitative, but there can be used other storage media which are less in the limit of the number of times of writing than hard disks, for example.

Next, an embodiment in which the functions of the storage control device 1 are applied to a storage system including a storage group forming a RAID (redundant arrays of inexpensive disks) will be described as a second embodiment.

(b) Second Embodiment

Figure 2:
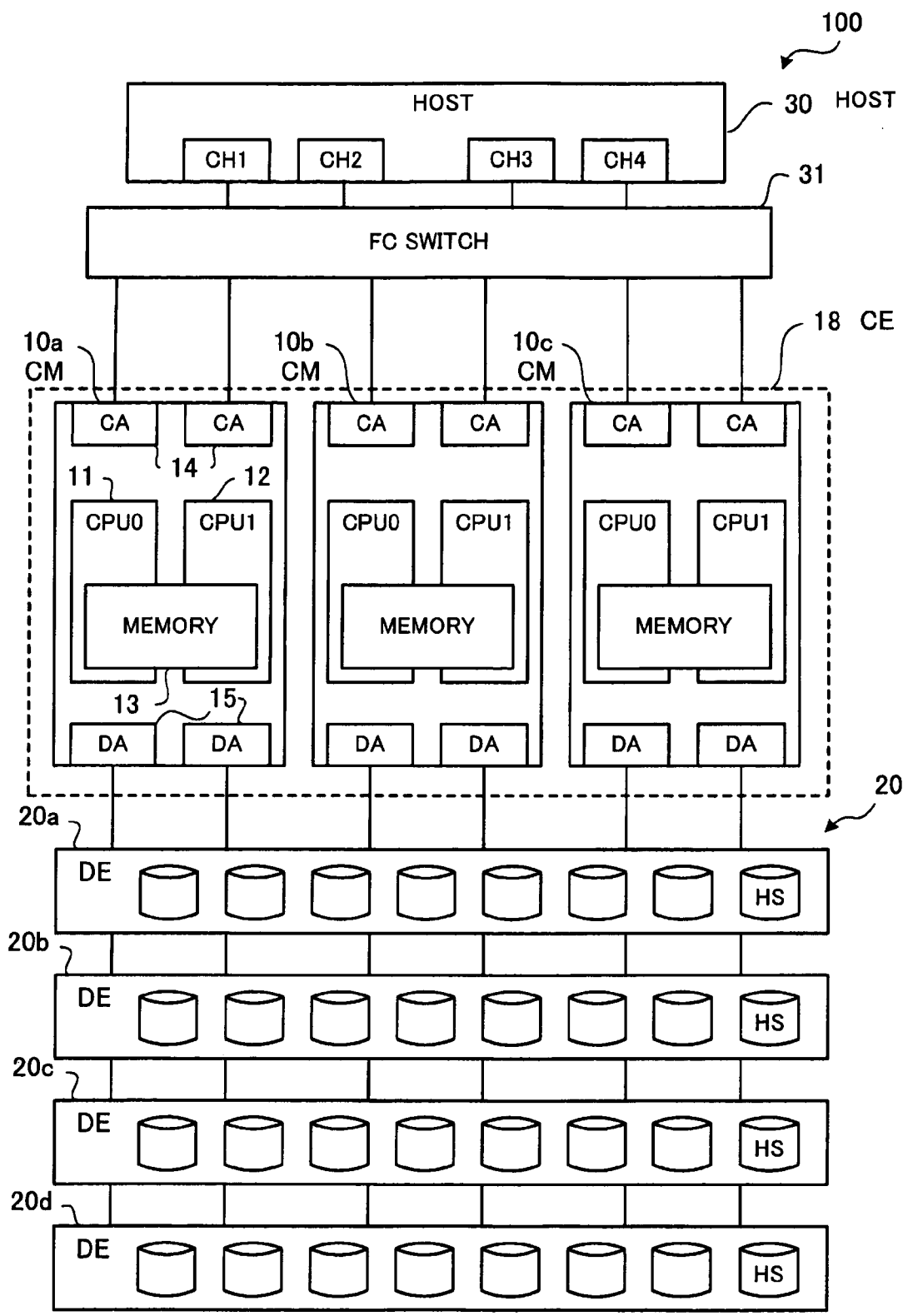
FIG. 2 is a block diagram of a storage system according to a second embodiment.

FIG. 2 is a block diagram of the storage system according to the second embodiment.

The storage system 100 includes a host computer (hereinafter simply referred to as the "host") 30, control modules (CMs) 10a, 10b, and 10c for controlling the operations of the disks, and drive enclosures (DEs) 20a, 20b, 20c, and 20d in which storage device groups are mounted.

In the storage system 100, the drive enclosures 20a, 20b, 20c, and 20d forming RAIDs and the host 30 are connected via the control modules 10a, 10b, and 10c.

The storage system 100 includes two or more control modules used for operating the storage system 100 whereby the redundancy thereof is secured.

The control modules 10a, 10b, and 10c are mounted in a controller enclosure (CE) 18. The control modules 10a, 10b, and 10c function as storage control devices, respectively.

Although one host 30 is illustrated in FIG. 2, a plurality of hosts may be connected to the controller enclosure 18.

The control modules 10a, 10b, and 10c transmit I/O commands as access instruction information to the drive enclosures 20a, 20b, 20c, and 20d, for instructing input and output of data to and from the storage areas of the storage devices. Further, the control modules 10a, 10b, and 10c transmit abort instruction commands to the drive enclosures 20a, 20b, 20c, and 20d, for suspending the instructed input or output processing, when no responses are obtained even if an access monitoring time period has elapsed after instructing data input or output thereto.

The storage device groups mounted in the drive enclosures 20a, 20b, 20c, and 20d are configured as RAIDs by taking redundancy into account.

The RAID groups formed in the drive enclosures 20a, 20b, 20c, and 20d each comprise a plurality of hard disk drives or a plurality of SSDs.

Here, the entire control module 10a is controlled by a CPU (central processing unit) 11 and a CPU 12. In FIG. 2, a "CPU 0" of the control module 10a is a name for identifying the CPU 11, and a "CPU 1" of the same is a name for identifying the CPU 12.

A memory 13, channel adapters (CAs) 14, and device adapters (DAs) 15 are connected to the CPU 11 and the CPU 12 via an internal bus.

The memory 13 temporarily stores at least some of programs caused to be executed by the CPUs 11 and 12. Further, the memory 13 is shared by the CPUs 11 and 12, for storing various data necessary for processing by the CPUs 11 and 12.

The channel adapters 14 are connected to a fiber channel (FC) switch 31, and are further connected to channels CH1 CH2 CH3, and CH4 of the host 30 via the fiber channel switch 31. Data are transmitted and received between the host 30 and the CPUs 11 and 12 via the channel adapters 14 and the fiber channel switch 31.

The device adapters 15 are connected to the external drive enclosures 20a, 20b, 20c, and 20d. The CPUs 11 and 12 transmit and receive data to and from the external drive enclosures 20a, 20b, 20c, and 20d via the device adapters 15.

The control modules 10b and 10c have the same hardware configurations as that of the control module 10a. The hardware configuration makes it possible to realize the processing functions of each of the control modules 10a, 10b, and 10c.

Figure 3:
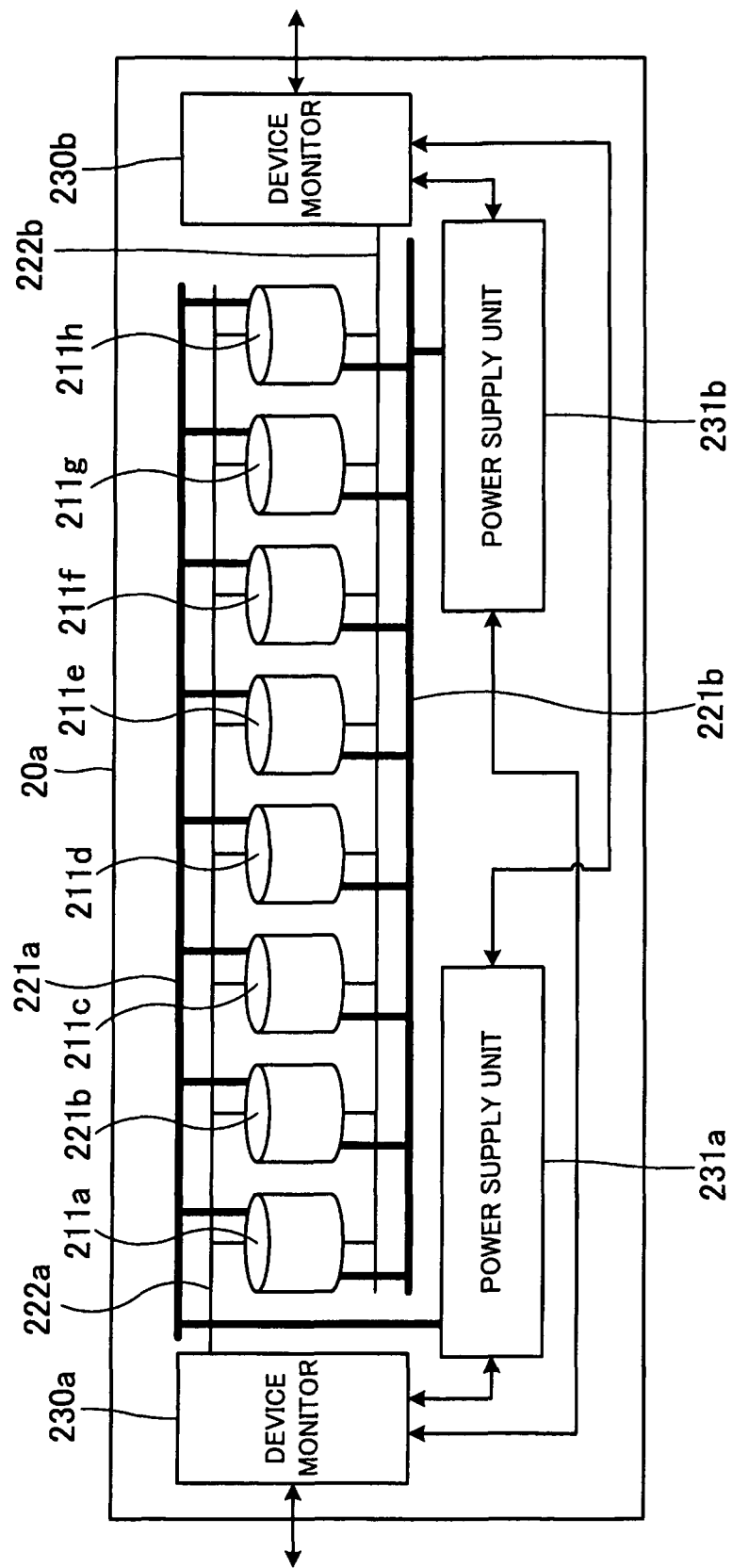
FIG. 3 illustrates an example of a drive enclosure.

FIG. 3 illustrates an example of the drive enclosure.

The drive enclosure 20a includes a plurality of storage devices 211a, 211b, 211c, 211d, 211e, 211f, 211g, and 211h, and a plurality of power supply units (PSUs) 231a and 231b for supplying electric power to the storage devices 211a to 211h via power supply paths 221a and 221b. Further, the drive enclosure 20a includes a plurality of device monitors (PBCs: port bypass circuits) 230a and 230b connected to the storage devices 211a to 211h via input and output paths 222a and 222b.

The respective storage devices 211a to 211h are supplied with electric power from both of the power supply units 231a and 231b.

The storage devices 211a to 211h are a mixture of Hard disks and SSDs.

The power supply units 231a and 231b are each capable of supplying electric power enough to simultaneously put all the storage devices 211a to 211h of the drive enclosure 20a into operation, and further to simultaneously start a predetermined number of storage devices of all the storage devices 211a to 211h.

As described above, the power supply units 231a and 231b each have a redundant configuration, and hence even if one of the power supply units becomes faulty, it is possible to prevent stoppage of the power supply to the storage devices 211a to 211h.

The device monitors 230a and 230b read information from or write information in the storage devices 211a to 211h based on instructions from the control modules 10a to 10c.

Further, the device monitors 230a and 230b monitor the storage devices 211a to 211h to detect an operating state (i.e. in-operation, starting, or stoppage state) of each of them. Here, the term "in-operation state" is intended to mean a stable state after being started, and the data writing or reading processing is performed when the storage device in the in-operation state.

Furthermore, the device monitors 230a and 230b monitor the power supply units 231a and 231b to detect an operation mode or failure of each of them. Further, the device monitors 230a and 230b detect the maximum amount of electric power that can be supplied from each of the power supply units 231a and 231b, and the amount of electric power currently used by each of the power supply units 231a and 231b.

The other drive enclosures from 20b to 20d as well have the same configuration as the drive enclosure 20a.

A drive enclosure group 20 formed by the above-described drive enclosures 20a to 20d has a RAID construction in which information, such as user information, is divided for storage in a plurality of associated storage devices out of the storage devices of the respective drive enclosures 20a to 20d, or the same information is stored the plurality of the associated storage devices.

Further, the drive enclosure group 20 has a plurality of RAID groups each constructed by one or a plurality of storages out of storages provided in each of the drive enclosures 20a to 20d. Here, in the drive enclosure group 20, each RAID group is configured as a logical volume. Although in the present embodiment, the RAID group and the logical volume coincide with each other, this is not limitative, but a plurality of RAID groups may be configured as one logical volume or one RAID group may be divided into a plurality of logical volumes. Further, although in FIGS. 2 and 3, each of the drive enclosures 20a to 20d has the eight storage devices 211a to 211h, this is not limitative, but each drive enclosure may have a desired number of storages.

Figure 4:
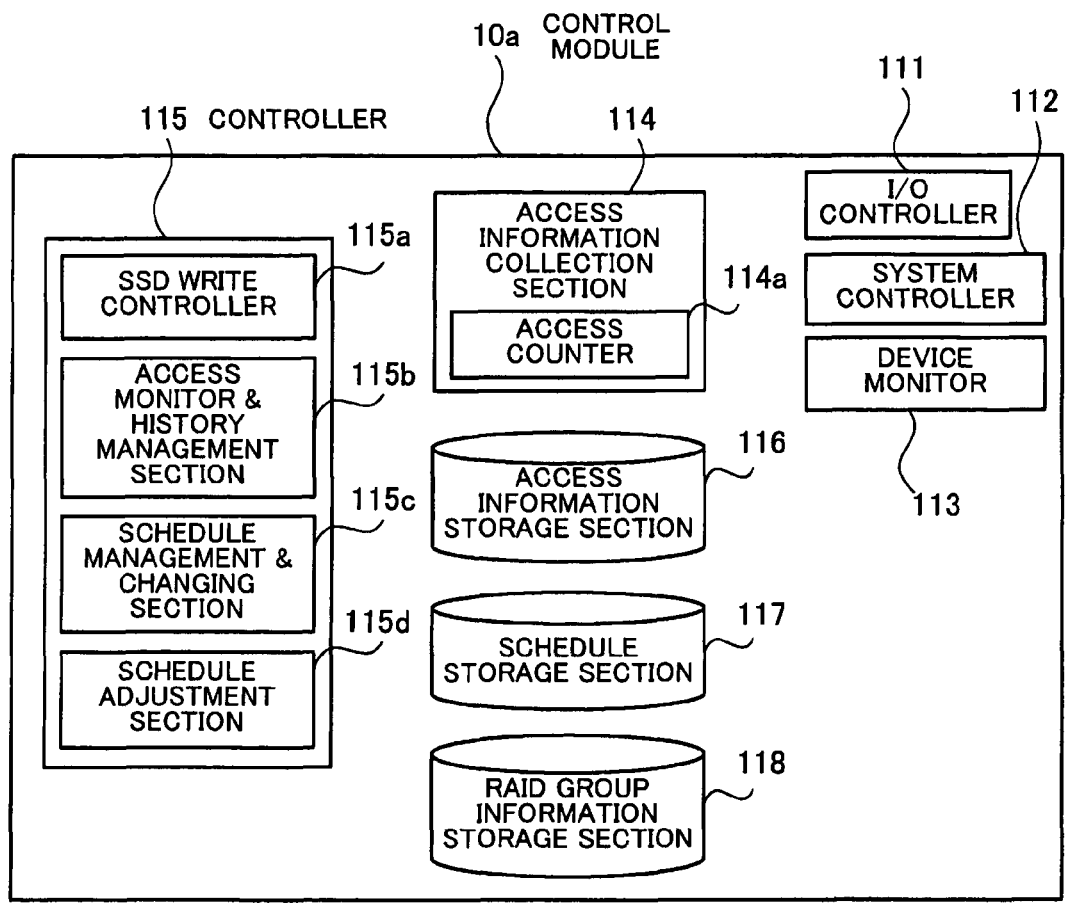
FIG. 4 is a functional block diagram of a control module.

FIG. 4 is a functional block diagram of the control module.

Although in the following, a description will be given of the functions of the control module 10a, the control modules 10b and 10c as well have the same functions.

The control module 10a includes an input/output controller 111, a system controller 112, a device monitor 113, an access information collection section 114, a controller 115, an access information storage section 116, a schedule storage section 117, and a RAID group information storage section 118.

The input/output controller 111 processes an input or output request from the host 30. Specifically, the input/output controller 111 controls the data writing or reading process on the drive enclosures 20a to 20d.

The system controller 112 controls all the storage devices. For example, the system controller 112 controls supply of electric power to the storage devices.

The device monitor 113 monitors the states of each storage device. Examples of the states of each storage device include an in-operation state of each storage device, a state of power supply thereto, etc.

The access information collection section 114 controls the collection of the numbers of times of data access to the drive enclosures 20a to 20d by the host 30, based on processing requests from the host 30, and includes an access counter 114a for counting the numbers of times of data access by the host 30.

The access information collection section 114 collects the numbers of times of data access from the host 30 on a data item-by-data item basis in cooperation with the input/output controller 111.

The controller 115 stores and manages the numbers of times of access from the host 30. The controller 115 includes an SSD write controller 115a, an access monitor and history management section 115b, a schedule management and change section 115c, and a schedule adjustment section 115d.

The SSD write controller 115a determines based on a state of access to the storage devices and an access schedule whether it is necessary to execute write access to SSDs, or save data in storage media other than the SSDs, and executes writing or saving processing which has been determined to be executed. Further, the SSD write controller 115a determines whether or not to control writing of data in SSDs when the write access to SSDs has not been performed for a predetermined time period, and manages and controls storage media in which data has been saved when there is a possibility that the access schedule is to be updated within a predetermined time period.

The SSD write controller 115a corresponds to the determination section 12c and the writing section 13c as illustrated in FIG. 1.

The access monitor and history management section 115b monitors a state of data access to the storage devices on a date and time basis. Specifically, the access monitor and history management section 115b generates access frequency information by collecting the number of times of access acquired by the access information collection section 114 on a data item-by-data item basis and at predetermined time intervals. Then, the access monitor and history management section 115b stores the generated access frequency information in the access information storage section 116.

Further, the access monitor and history management section 115b generates information which stepwise indicates criteria for determining whether to perform writing, on a data item-by-data item basis, based on the access frequency information. Although this information as well indicates the frequency of access, it will be referred to hereinafter as the "access history information", for convenience of description. The access monitor and history management section 115b stores the generated access history information in the access information storage section 116.

The access monitor and history management section 115b corresponds to the generation section 11c illustrated in FIG. 1.

The schedule management and change section 115c manages a schedule that is generated based on the access history information, for use in writing data in RAID groups formed of SSDs (SSD RAID groups). The schedule serves as criteria for determining whether or not it is time to write data in an SSD RAID group. Further, the schedule is changed on an as-needed basis.

Specifically, the schedule management and change section 115c generates renewal operational ranks, based on the access history information generated by the access monitor and history management section 115b, and thereby generates a schedule for writing data in the SSD RAID groups.

Further, if the schedule has already been generated, the schedule management and change section 115c optimizes the schedule based on the present schedule already formed and a schedule newly generated based on one-day history, to thereby generate a renewal schedule. The schedule thus generated is stored in the schedule storage section 117. A method of optimizing the schedule will be described hereinafter.

The schedule management and change section 115c may generate the renewal schedule based on an access history or the like (e.g. an access history over an immediately preceding predetermined time period).

Further, the schedule management and change section 115c may adjust the renewal schedule based on a history of access in the past to SSD RAID groups or a schedule set by the user. A method of adjusting the schedule will be described hereinafter.

For example, if the date of generating a new update schedule is Sunday, Nov. 1, 2009, the schedule management and change section 115c can change a renewal schedule generated based on access history information collected recently, such as access history information on the first day of each month over the past several months, access history information on Sunday of the first week of each month over the past several months, access history information on Sundays in the past, and access history information on November 1 of the immediately preceding year.

The schedule adjustment section 115d updates the schedule optimized by the schedule management and change section 115c, at predetermined time intervals, based on the schedule generated by the schedule management and change section 115c and the present schedule in operation. To update the schedule, it is possible to give priority to a schedule generated by the user.

The access information storage section 116 stores the number of times of write access on a data item basis and on an SSD RAID group basis. The access information storage section 116 also stores the number of times of read access to each data item in a target SSD RAID group, and the frequency of write access to each data item in the target SSD RAID group.

Further, the access information storage section 116 also stores access history information other than that of today (processing day).

The schedule storage section 117 stores various kinds of information for managing the schedules.

The RAID group information storage section 118 stores a last write access time on a data item basis and on an SSD RAID group basis. The RAID group information storage section 118 also stores saved data management information on data items for SSD RAID groups, which are saved in other areas, on an SSD RAID group basis. The saved data management information contains information on save destinations, save sources, and so forth.

Areas for, designation as save destinations include RAID groups having hard disks, which are nonvolatile media, virtual volumes, such as thin provisioning pools. In the following description, each area designated as a save destination is referred to as a "pool area".

The input/output controller 111, the system controller 112, the device monitor 113, the access information collection section 114, and the controller 115 can be realized by the functions of the CPUs 11 and 12 provided in the control module 10a. Further, the CPUs 11 and 12 each may have these functions.

The access information storage section 116, the schedule storage section 117, and the RAID group information storage section 118 can be realized by the memory 13.

Next, a detailed description will be given of information stored in the access information storage section 116, the schedule storage section 117, and the RAID group information storage section 118.

Figure 5:
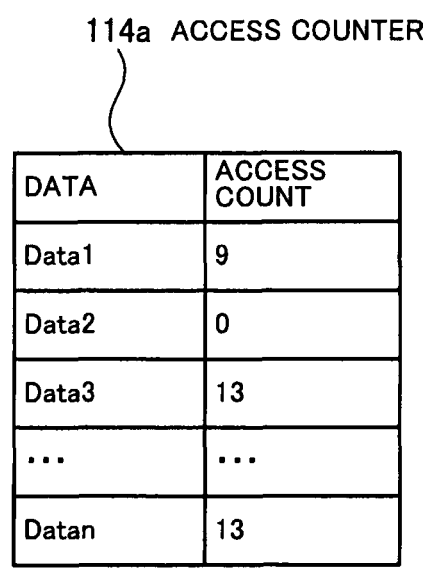
FIG. 5 illustrates an access counter.

FIG. 5 illustrates an access counter.

The access counter 114a illustrated in FIG. 5 includes the columns of data and access count. Items of information arranged in a row in the access counter are associated with each other.

The column of data stores names for identifying data items.

The column of access count stores the number of times of write access (access count) for writing data in a storage area of a storage device.

FIG. 6 illustrates the access frequency information.

An access frequency management table 116a is provided on a data item-by-data item basis.

The access frequency management table 116a illustrated in FIG. 6 includes the columns of time and access count. Items of information arranged in a row in the access frequency management table 116a are associated with each other.

In the column of time, time points are set at predetermined time intervals. In FIG. 6, the time interval is set to one minute.

The column of access count stores an access count at each time point. For example, the row of a time point of 00:00:00 stores an access count from 00:00:00 to 00:00:59.

Figure 7:
FIG. 7 illustrates access history information.

FIG. 7 illustrates the access history information.

An access history management table 116b is provided on a data item-by-data item basis.

The access history management table 116b illustrated in FIG. 7 includes the columns of time, operational rank, and count. Items of information arranged in a row in the access history management table 116b are associated with each other.

In the column of time, predetermined time zones are set. In FIG. 7, the time zones are set for every 30 minutes.

In the column of operational rank, an operational rank (access history information) is set for each time zone.

The operational ranks are set based on predetermined criteria and values in the column of count.

For example, if a value in the column of count is not smaller than 300, an operational rank associated with this value of count is set to "A". If a value in the column of count is between 200 and 299, an operational rank associated with this value of count is set to "B". If a value in the column of count is between 1 and 199, an operational rank associated with this value of count is set to "C". If a value in the column of count is equal to 0, an operational rank associated with this value of count is set to "D".

The column of count stores access counts each accumulated based on information in the access frequency management table 116a. For example, a count associated with a time period from 00:00:00 to 00:30:00 in the column of time indicates a total of access counts from 00:00:00 to 00:30:00 in the access frequency management table 116a.

Next, a description will be given of items of information stored in the schedule storage section 117.

FIG. 8 illustrates schedule management information. In FIG. 8, the schedule management information is illustrated in a tabular form.

A schedule management tables 117a is provided for each data item.

Each schedule management table 117a includes the columns of time, present operational rank, today operational rank, and renewal operational rank. Items of information arranged in a row in the schedule management table 117a are associated with each other.

In the column of time, time zones are set for every same time period as in the access history management table 116b.

The column of present operational rank stores an average of operational ranks in each identical time zone until yesterday. The SSD write controller 115a executes an SSD write control process, referred to hereinafter, based on the present operational ranks. A collection of the operational ranks in the respective time zones forms a schedule.

The column of today operational rank stores operational ranks for today (processing day) stored in the access history management table 116b, on a time zone-by-time zone basis.

The column of renewal operational rank stores renewal operational ranks generated by the schedule management and change section 115c.

Further, in the column of time, if the schedule is for a half day, time periods are set every 30 minutes for 12 hours from 00:00:00 to 11:59:59. If the schedule is for a whole day, time periods are set every 30 minutes for 24 hours from 00:00:00 to 23:59:59.

The schedule management and change section 115c generates priority information indicative of the priorities (operational ranks A to D) of respective data items stored in the SSD RAID groups, for each predetermined time zone.

More specifically, the column of renewal operational rank in the schedule management table 117a stores the operational ranks A to D based on the frequencies of access from the host 30, as indexes indicative of priorities according to which data items are to be saved in the pool area.

The operational rank A represents that, in principle, data items set thereto are to be saved in the pool area (data to be saved with the highest priority).

The operational ranks B and C represent that, in principle, data items set thereto are to be saved in a pool area but that when not accessed for not shorter than respective predetermined time periods, they are written in an SSD RAID group (data to be saved with priorities). Here, the above-mentioned predetermined time period set for data of the operational rank B is set to be longer than the predetermined time period set for data of the operational rank C. The predetermined time periods are set for the respective operational ranks so as to suppress high frequency access to the SSD RAID groups.

The operational rank D represents that data items set thereto are to be written in an SSD RAID group without being saved in the pool area (data inhibited from being saved).

FIG. 9 illustrates schedule adjustment and management information. In FIG. 9, the schedule adjustment and management information is illustrated in a tabular form.

A schedule adjustment management table 117b is provided on a day-by-day basis.

The schedule adjustment management table 117b includes the columns of time, operational rank RLU#0, operational rank RLU#1 . . . , and operational rank RLU#4.

In the column of time, the same time periods are set as in the access history management table 116b.

The columns of the operational ranks for respective RLUs (RAID group logical units) store operational ranks formed respectively by integrating operational ranks of respective data items generated based on the renewal operational ranks of the schedule management table 117a by taking into account operational ranks set by the user, on an RLU-by-RLU basis and on a time zone-by-time zone basis. A method of generating the operational ranks will be described hereinafter.

Next, a description will be given of the data items stored in the RAID group information storage section 118.

FIG. 10 illustrates RAID group information. In FIG. 10, the RAID group information is illustrated in a tabular form.

A RAID group information management table 118a illustrated in FIG. 10 includes the columns of RLU number (RLU No.), status, disk type, last write time, write access rank, temporary data flag, and temporary RLU number (temporary RLU No.). Items of information arranged in a row in the RAID group information management table 118a are associated with each other.

Items of information for identifying the RAID groups are set in the column of RLU number.

Items of information indicative of whether the RLUs set in the column of RLU number are available or non available are set in the column of status.

The column of disk type stores the types of disks forming the RAID groups. In the present embodiment, there are set three disk types: SSD, FC/SAS (serial attached SCSI disk), and SATA (serial ATA). In FIG. 10, the serial attached SCSI disk is simply denoted as "FC/SAS" and the serial ATA disk is simply denoted as "SATA".

The column of last write time stores last access times at each of which a write access to a RAID group has been performed. The last write time is used for determining based on the last access time whether to update data written in an SSD RAID group by write data or to save the write data.

The column of write access rank stores operational ranks each indicative of the frequency of write access to the associated RAID group. The operational ranks are formed by integrating respective operational ranks of data items of a corresponding time zone in the schedule management table 117a as illustrated in FIG. 8, on a RAID group-by-Raid group basis.

The write access ranks are calculated by a method, described hereinafter. Each write access rank is always changed according to a state of access to the associated RAID group. Further, the write access rank is calculated by taking predicted write access into account. The write access ranks as well are used for determining whether to update data written in the associated SSD RAID group by write data or to save the write data.

The column of temporary data flag stores one of "on", "off" and "-".

When "SSD" is set in the column of disk type, the associated temporary data flag serves as information indicative of whether or not there is data saved therefrom in another RAID group. If there is such data, "on" is stored, whereas if not, "off" is stored in the column of disk type.

For example, as for a record of the fourth row of the RAID group information management table 118a, "SSD" is set in the column of disk type, and "off" is stored in the column of temporary data flag. This indicates that data for RLU#3 is not saved. Further, as for a record of a first row of the RAID group information management table 118a, "SSD" is also set in the column of disk type, and "on" is stored in the column of temporary data flag. This indicates that there is data for RLU#0, which is saved therefrom in a RAID group having a RLU number other than RLU#0.

When a disk type other than "SSD" is set in the column of disk type, an associated temporary data flag serves as information indicative of whether or not a RAID group of a corresponding RLU number has received saved data. If the RAID group of the corresponding RLU number has received the saved data, "on" is stored, whereas if the RAID group of the corresponding RLU number has not received the saved data, "-" is stored, in an associated box of the column of temporary data flag.

For example, as for the record of the fifth row of the RAID group information management table 118a, "FC/SAS" is set in the column of disk type, and "on" is stored in the column of temporary data flag. This indicates that the RAID group RLU#4 has received saved data.

The column of temporary RLU number stores information of a RAID group in which data has been saved, i.e. the saved data has been received.

When "SSD" has been set in the column of disk type, an associated temporary RLU number serves as information indicative of a save destination in which data has been saved. If there are a plurality of RAID groups in which data items have been saved, information of the RLU numbers of all the RAID groups in which the data items have been saved is stored in the column of temporary RLU number. When a disk type other than "SSD" is set in the column of disk type, an associated temporary RLU number serves as information indicative of a save source from which data has been saved.

For example, as for the record of the first row of the table, "4" is stored in the column of temporary RLU number. This indicates that a save destination into which data subjected to write access to the RAID group RLU#0 has been saved is the RAID group RLU#4. Further, as for the record of the fifth row of the table, "0" is stored the column of temporary RLU number. This indicates that a save source from which data received by the RAID group of RLU#4 has been saved is the RAID group RLU#0.

FIG. 11 illustrates saved data management information. In FIG. 11, the saved data management information is illustrated in a tabular form.

A saved data management table 118b is provided with columns of save source RLU number (SRC. RLU No.), save destination RLU number (DST. RLU No.), start offset, data size, offset, and valid flag. Items of information arranged in a row in the saved data management table 118b are associated with each other.

The column of save source RLU number stores items of information for identifying RAID groups as data save sources, that is, the RLU numbers. For example, if the save source RLU is RLU#0, "0" is stored in the column of save source RLU number. Further, if the save source RLU is RLU#1, "1" is stored in the column of save source RLU number.

The column of save destination RLU number stores items of information (numbers) for identifying RAID groups as data save destinations. In the example illustrated in FIG. 11, "4" stored in the column of save destination RLU number indicates RLU#4.

The column of start offset stores items of information indicative of start positions of respective save source data items of the RAID groups stored in the column of save source RLU number.

The column of data size stores information indicative of the data sizes of the respective save source data items of the RAID groups stored in the column of save source RLU number.

The column of offset stores information indicative of the start positions of respective save source data items stored in the RAID groups in the column of save destination RLU number. For example, as for a record of a first row of the saved data management table 118b, the data size is "0x00001000", and the offset is "0x00000000". This indicates that saved data in the first row has been written from "0x00000000" to "0x00000FFF". Therefore, it is understood that next data can be written from "0x00001000" next to "0x00000FFF". Therefore, "0x00001000" is stored in the column of offset in a record of the second row of the table.

Flags for identifying whether the contents of respective corresponding records are valid or invalid are set in the column of valid flag. The flag of "on" indicates that the contents of a corresponding record are valid, whereas the flag of "off" indicates that the contents of a corresponding record are invalid.

The column of valid flag is provided because when the same saved data is accessed again, access processing is different depending on whether the re-access is within the ranges of the start offset and the data size recorded in the records of the saved data management table 118b.

When the re-access is a write access within the range defined by the start offset and the data size, the SSD write controller 115a updates an area of the save destination as it is. In this case, the valid flag is held "on".

When the re-access is a write access not within the range defined by the start offset and the data size, the SSD write controller 115a cancels the area of the saved destination already held and secures a new area of the save destination for update. In this case, the SSD write controller 115a rewrites the valid flag from "on" to "off".

FIGS. 12A and 12B illustrate examples of update of the saved data management table.

In a case where a write access of a start offset "0x00150000" and a data size "0x00002000" is generated, it is known by referring to the respective items of information set forth in the record of the first row of the saved data management table 118b illustrated in FIG. 12A that data in the record of the first row cannot be updated. The following is a detailed description thereof.

FIG. 12A illustrates the saved data management table before generation of write access to RLU#0.

In FIG. 12A, a save data item having a start offset of "0x00150000" and a data size of "0x00001000" is saved in RLU#4 with an offset of "0x00000000".

Similarly, in FIG. 12A, a save data item having a start offset of "0x11223300" and a data size of "0x00022000" is saved in RLU#4 with an offset of "0x00001000".

Let it be assumed that a write access to the RLU#0, which has a start offset of "0x00150000" and a data size of "0x00002000", is generated.

Referring to FIG. 12A, the save data item having the start offset of "0x00150000" is written from "0x00000000" of RLU#4, and then the save data item having the start offset of "0x11223300" is written from "0x00001000" of RLU#4.

Since the current write access is for data having a data size of "0x00002000", it is impossible to update the access target data in the area of RLU#4 in which the data having the start offset of "0x00150000" and the data size of "0x00001000" is saved.

Therefore, as in the saved data management table 118b illustrated in FIG. 12B, the new save data is newly saved and the existing save data i.e. saved data is deleted. More specifically, information recorded in the record of the first row becomes no longer available, and hence the valid flag in the record of the first row is set to "off". Further, the value of the start offset is not used and hence is deleted (which is denoted by "-" in FIG. 12B). By referring to information of the data size, the offset and the valid flag in the record of the first row of the table 118b in FIG. 12B, it is understood that a save area for a data size of "0x00001000" becomes free or available from the offset "0x00000000". Therefore, the remaining information in the record in the first row is left behind without being deleted, and a record having the same start offset as was stored in the first row is newly generated in a sixth row. More specifically, the start offset "0x00150000" having been stored in the first row is stored in a box of the column of start offset in a record of the sixth row. The data size "0x00002000" of the current access target data is stored in a box of the column of data size in the record of the sixth row. The information "0x00027710" indicative of the start position of save source data having been stored in RLU#4 is stored in a box of the column of offset in the record of the sixth row.

Thereafter, when performing saving of data for write access as the above-described processing for the update, if the data size of the data to be saved is within the difference between the offset in the second row and the offset in the first row of the saved data management table 118b, it is possible to store the data to be saved in the area of RLU#4 indicated by the record in the first row.

When the amount of information (record count) storable in the saved data management table 118b has reached a predetermined upper limit, it is possible to forcibly write the saved data in a save source to reset save destination information associated with the data written in the save source. This will be described in detail in a step S23, referred to hereinafter.

Next, a description will be given of an outline of processes carried out by the control module 10a, and then a description will be given of each of the processes with reference to flowcharts.

<Outline of Processes>

In the control module 10a, when one of the channel adapters 14 accepts an input/output access from the host 30, the input/output controller 111 checks position information on a location where data is actually stored or saved, i.e. a RAID group, disk or SSD.

Here, the access information collection section 114 monitors a state of access to the SSD RAID groups. The monitoring of the access state is performed on all the RAID groups including the SSD RAID groups, based on the access counts.

When an access to an SSD RAID group occurs, processing executed by the SSD write controller 115a depends on the type of the access.

For Write Access

When the access is a write access to an SSD RAID group, the SSD write controller 115a changes processing depending on whether the access to the SSD RAID group is a first-time access or an update access (a second or later access).

Figure 13:
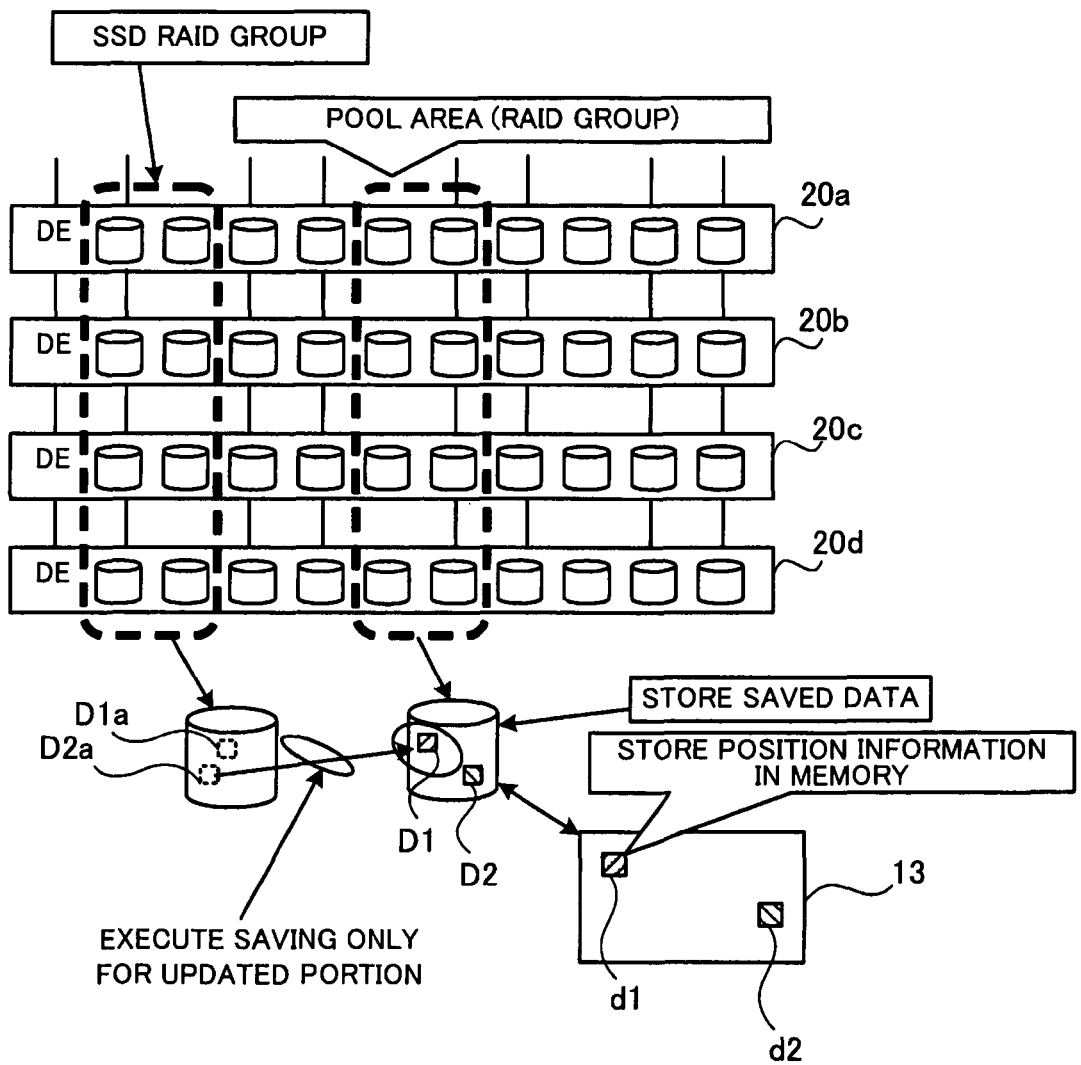
FIG. 13 is a view useful in explaining data saving performed during write access.

FIG. 13 is a view useful in explaining data saving performed during the write access.

In the case of the first-time access, the SSD write controller 115a writes data in the SSD RAID group.

In the case of the update access, the SSD write controller 115a refers to the column of write access rank of the RAID group information management table 118a, and checks a state of access to the volume of the RAID group as a target of write access.

When the operational rank on the volume is B, C, or D, the SSD write controller 115a determines whether or not to make an immediate write access to the SSD RAID group, based on results of logical determination on write access, described hereinafter.

On the other hand, when the operational rank of the volume is A, the SSD write controller 115a does not make an immediate write access to the SSD RAID group. As illustrated in FIG. 13, the SSD write controller 115a saves only data D1 which is a newly added portion or an overwritten portion (updated portion) out of to-be-written data, in the pool area.

FIG. 13 illustrates storage areas (not updated areas) D1a and D2a of the SSD RAID group, in which the data D1 has not been written.

Further, FIG. 13 also illustrates previously saved data D2 which is stored in the pool area.

Position information d1 identifying a save position in the memory 13, in which the data D1 has been saved, is stored in the saved data management table 118b. Position information d2 on the previously saved data D2 is saved in the saved data management table 118b illustrated in FIGS. 12A and 12B.

Figure 14:
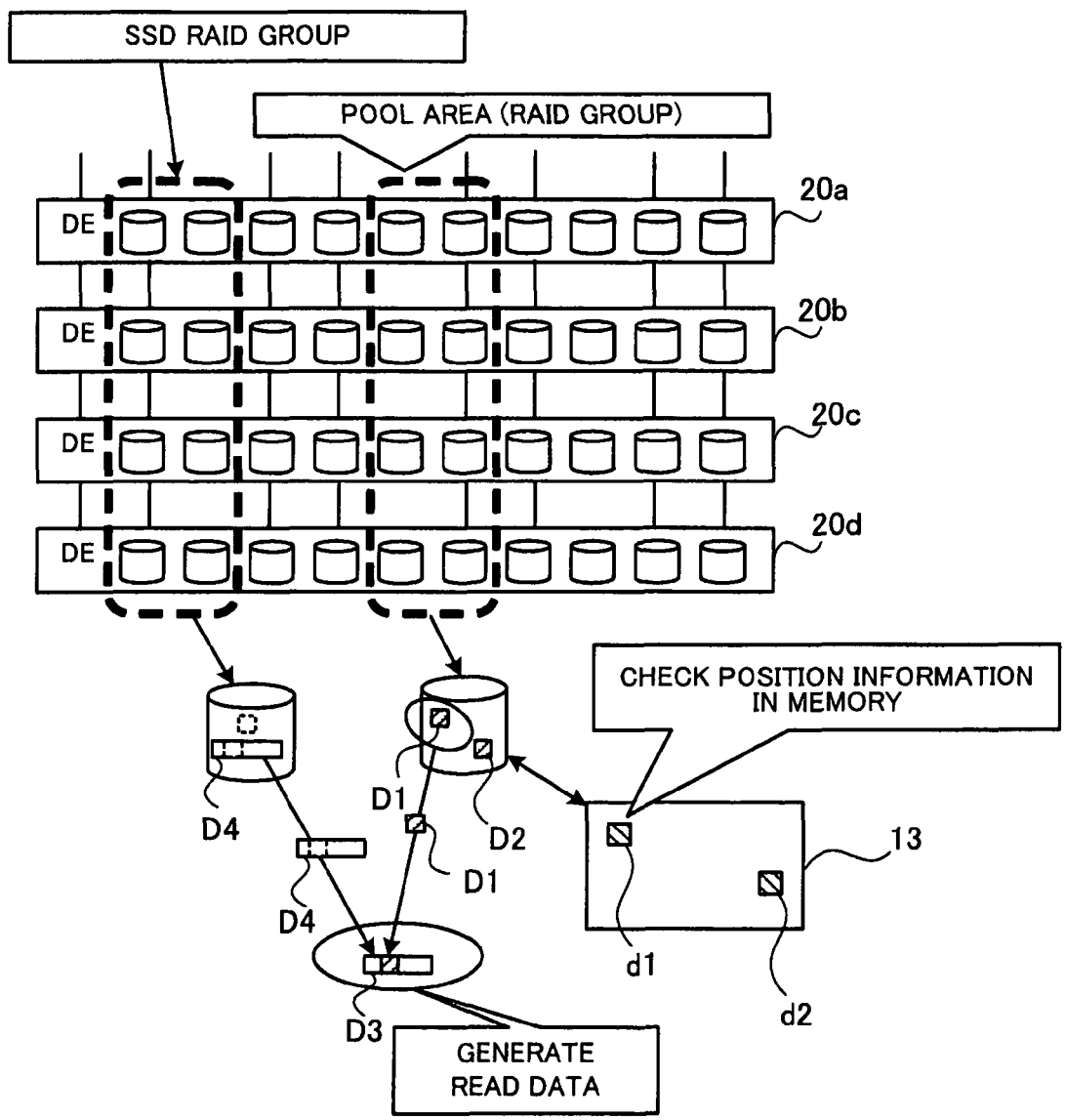
FIG. 14 is a view useful in explaining reading of data during a read access.

FIG. 14 is a view useful in explaining reading of data during a read access.

For Read Access

When a read access occurs, the processing is changed depending on whether or not data to be accessed for reading has been written in an SSD RAID group during the write access.

By referring to the column of start offset in the saved data management table 118b, it is possible to identify whether or not the data to be accessed for reading has been written in the SSD RAID group.

If the data to be read out by the read access is only data saved in the pool area, that is, if the data to be read out is only the data D1, for example, the column of offset in the saved data management table 118b is referred to so as to identify the position information d1 in the memory 13 for determining the save position in the memory 13, in which the data D1 has been saved. Then, only the saved data D1 is read out.

It is possible to determine whether or not the data to be read out by the read access is only the data saved in the pool area, by checking the data size of the data saved in the pool area through reference to the column of data size in the saved data management table 118b.

If the data to be read out by the read access contains data other than the data saved in the pool area, i.e. if the data to be read out includes both of data saved in the pool area and data stored in an SSD RAID group, data is read out from both the SSD RAID group and the pool area.

More specifically, when the data to be read out is data D3 containing the data D1, for example, as illustrated in FIG. 14, data D4 except for the data D1 of the data D3 is read out from the SSD RAID group. Then, the data D1 saved in the pool area is read out by referring to the saved data management table 118b, and data formed by adding the data D1 saved in the pool area to the data D4 is read out as the data D3.

On the other hand, when the data to be read out by the read access is only data stored in an SSD RAID group, the data stored in the SSD RAID group is read out.

Figure 15:
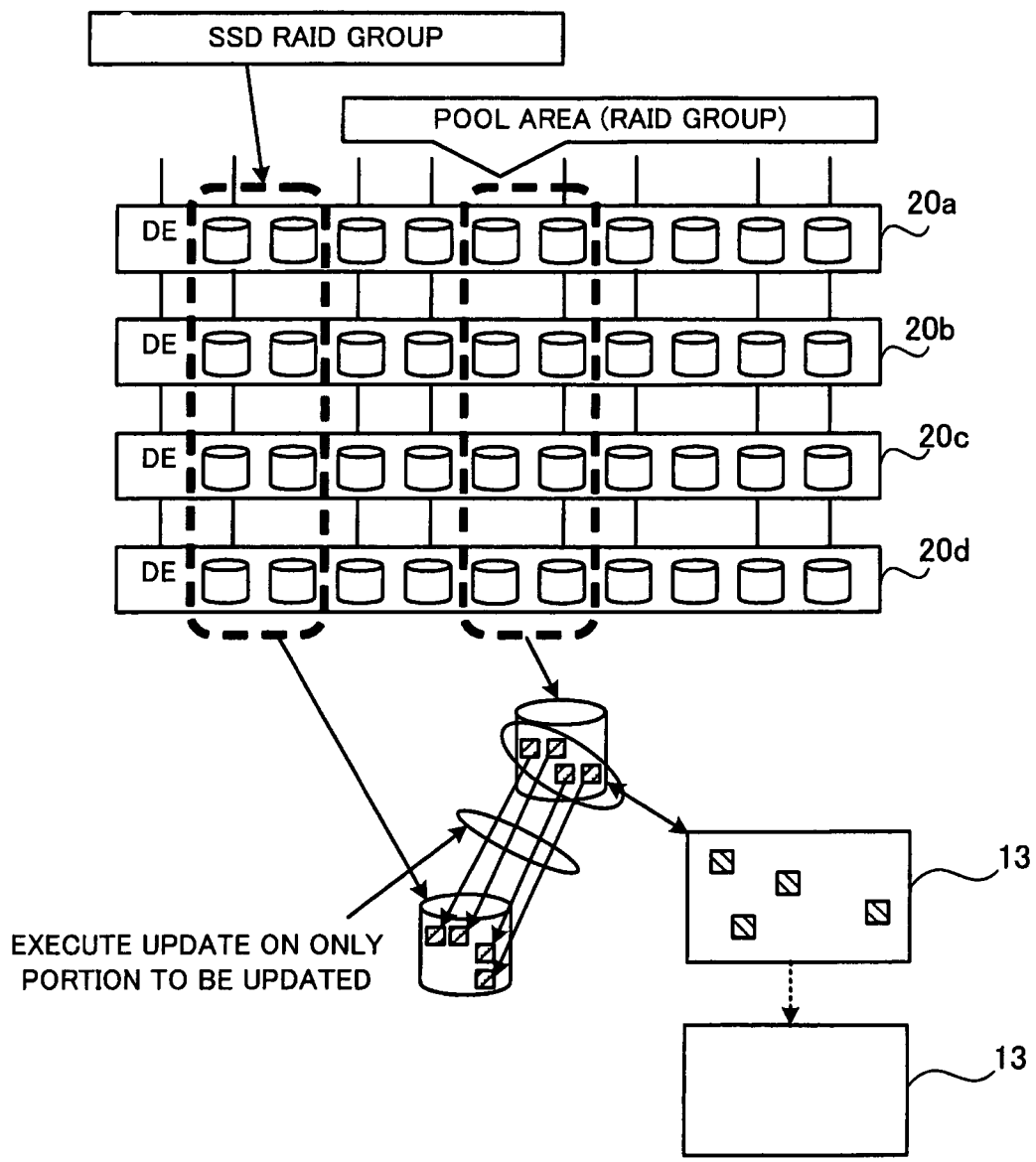
FIG. 15 illustrates an update process.

FIG. 15 illustrates an update process for updating data stored in an SSD RAID group with saved data.

When executing the update process for updating data stored in an SSD RAID group by data saved in the pool area, only part of the data stored in the SSD RAID group, which corresponds to the data saved in the pool area, is updated (denoted in FIG. 15 as "execute update on only portion to be updated"). After that, the data saved in the pool area is initialized. Further, a record of the saved data management table 118b concerning the saved data is also initialized.

Hereinafter, the outline of the above-described processes will be described in detail using a flowchart.

<Input/Output Control Process>

Hereinafter, a description will be given the input/output control process by the input/output controller 111.

Figure 16:
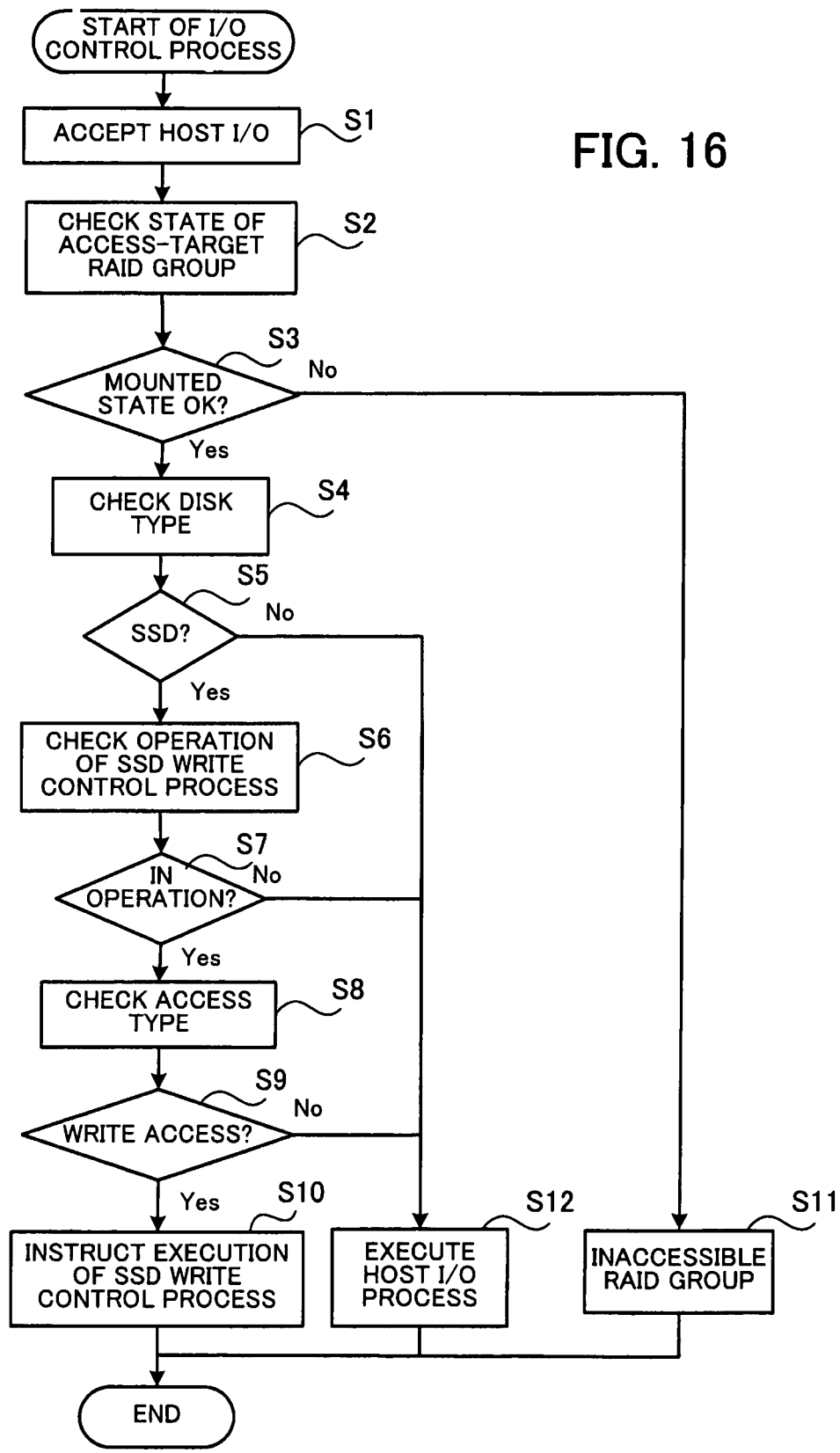
FIG. 16 is a flowchart of an input/output control process.

FIG. 16 is a flowchart of the input/output control process.

(Step S1) The input/output controller 111 accepts an input/output access from the host 30, and then the process proceeds to a step S2.

(Step S2) The input/output controller 111 refers to the RAID group information management table 118a to check a state of a RAID group to be accessed (RAID group designated by the input/output access) (hereinafter referred to as the "access-target RAID group"). The input/output controller 111 checks an operating state of the access-target RAID group, including a mounted state of the access-target RAID group, whether or not the access-target RAID group is in operation, etc., and then the process proceeds to a step S3.

(Step S3) The input/output controller 111 determines, based on the results of the check of the mounted state, whether or not the mounted state of the access-target RAID group is OK (without abnormally). The term "abnormality" is intended to mean a state where the access-target RAID group is not mounted, for example. If the mounted state of the access-target RAID group is OK (YES to the step S3), the process proceeds to a step S4, whereas if the mounted state of the access-target RAID group is not OK (NO to the step S3), the process proceeds to a step S11.

(Step S4) The input/output controller 111 refers to the column of disk type of the RAID group information management table 118a to check the disk type of the access-target RAID group, and then the process proceeds to a step S5.

(Step S5) The input/output controller 111 determines whether or not the disk type checked in the step S4 is SSD. If the checked disk type is SSD (YES to the step S5), the process proceeds to a step S6, whereas if the checked disk type is not SSD (NO to the step S5), the process proceeds to a step S12.

(Step S6) The input/output controller 111 checks a state of settings of operation of the SSD write control process. This step for checking the state of the settings is executed for the input/output controller 111 to check whether or not to cause the SSD write controller 115a to execute control based on a schedule. The controller enclosure 18 including the control modules 10a, 10b, and 10c is configured such that the user can set whether or not to cause each controller 115 to execute processing based on the schedule, that is, whether or not to perform the SSD write control process, and the input/output controller 111 checks the state of the settings. Then, the process proceeds to a step S7.

(Step S7) The input/output controller 111 determines whether or not the SSD write control process checked in the step S6 is in operation. If the SSD write control process is in operation (YES to the step S7), the process proceeds to a step S8, whereas if the SSD write control process is not in operation (NO to the step S7), the process proceeds to the step S12.

(Step S8) The input/output controller 111 checks a type of access (write access or read access) to an SSD RAID group as an access target.

(Step S9) The input/output controller 111 determines based on the result of the check in the step S8 whether or not the input/output access from the host 30 is a write access to the SSD RAID group. If the input/output access is a write access (YES to the step S9), the process proceeds to a step S10, whereas if the input/output access is not a write access (NO to the step S9), the process proceeds to the step S12.

(Step S10) The input/output controller 111 causes the SSD write controller 115a to execute the SSD write control process. This SSD write control process will be described in detail hereinafter. After that, the input/output control process is terminated.

(Step S11) The input/output controller 111 determines that the access-target RAID group is inaccessible, followed by terminating the input/output control process.

(Step S12) The input/output controller 111 executes a host input/output process on the access-target RAID group.

Specifically, if the input/output access from the host 30 is a data write request for writing data in other than the SSD RAID groups, the input/output controller 111 stores to-be-written data in the memory 13 and sends a response of termination of the requested write in the host 30. Further, the input/output controller 111 writes the data stored in the memory 13 in a corresponding part of an associated one of the RAID groups.

On the other hand, if the input/output access from the host 30 is a data read request, the input/output controller 111 determines whether or not to-be-read data is in the memory 13. Specifically, the input/output controller 111 refers to the column of temporary data flag associated with the access-target RAID group in the RAID group information management table 118a. If the to-be-read data is in the memory 13, the input/output controller 111 sends back the data in the memory 13 as a response to the host 30. If the to-be-read data is not in the memory 13, the input/output controller 111 reads out data from a corresponding part of an associated RAID group where there is actual data, loads the data in the memory 13, and then sends back the data as a response to the host 30.

Then, the input/output controller 111 terminates the input/output control process.

Next, a description will be given of the SSD write control process which is carried out by the SSD write controller 115a in response to an instruction from the input/output controller 111 in the step S10.

<SSD Write Control Process>

Figure 17:
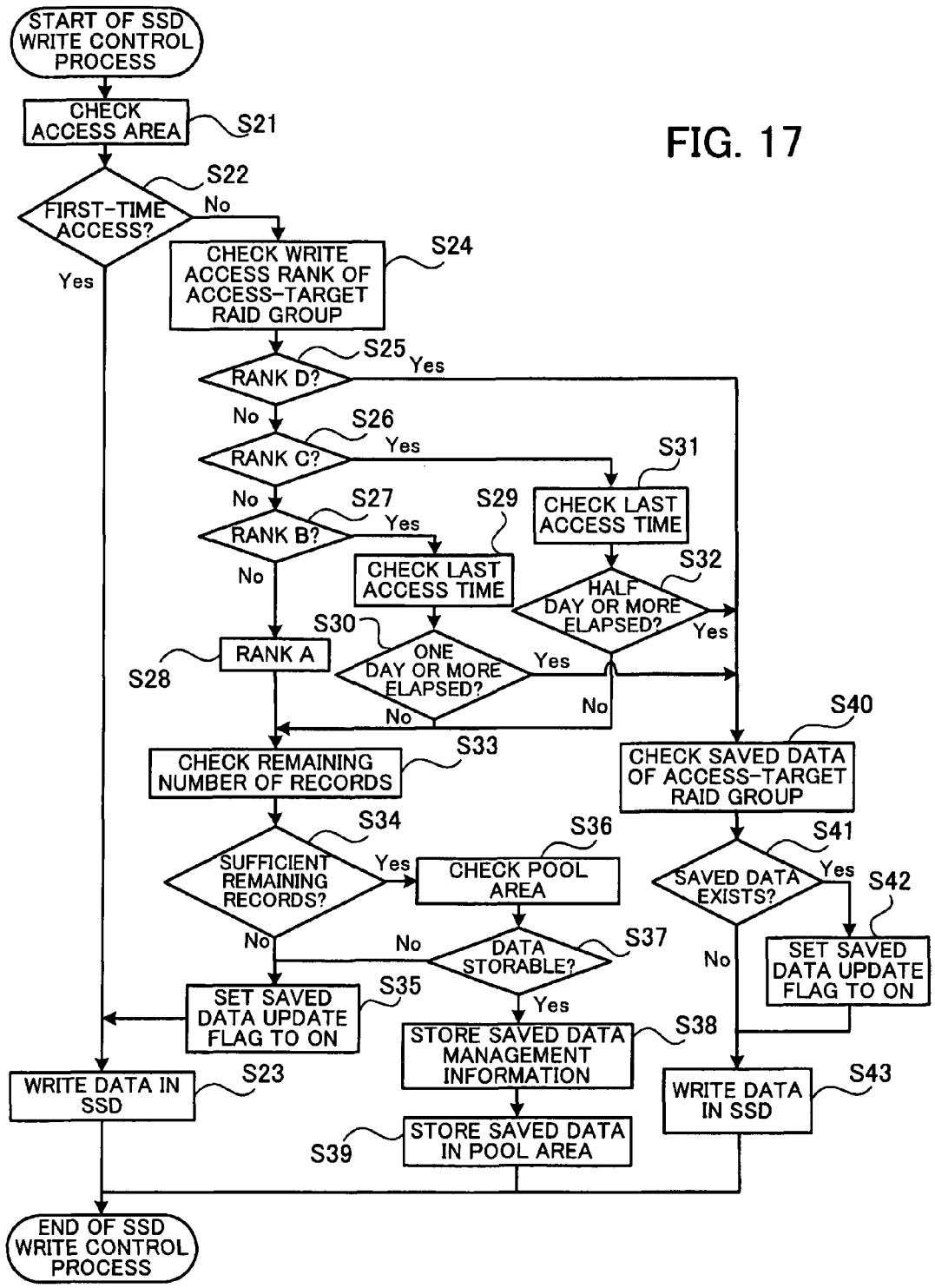
FIG. 17 is a flowchart of an SSD write control process.

FIG. 17 is a flowchart of the SSD write control process.

(Step S21) The SSD write controller 115a checks an area as an access target (access-target area) by the input/output access accepted in the step S1, and then the process proceeds to a step S22.

(Step S22) The SSD write controller 115a determines based on the check in the step S21 whether or not the input/output access is a first-time access to the access-target area. Specifically, the input/output controller 111 has information for identifying areas of SSD RAID groups in which data has already been written, and the SSD write controller 115a inquires of the input/output controller 111 as to whether or not data has already been written in an access-target area of the input/output access. As a result of the inquiry, when the access-target area is not an area in which data has already been written, the SSD write controller 115a determines that the input/output access is a first-time access. If the input/output access is a first-time access (YES to the step S22), the process proceeds to a step S23, whereas if not (NO to the step S22), the process proceeds to a step S24.

(Step S23) The SSD write controller 115a executes writing of data in an SSD RAID group. In doing this, the SSD write controller 115a checks a saved data update flag, referred to hereinafter. When the saved data update flag is "on", the SSD write controller 115a reads out, from a pool area as a save destination, data on which information is written in an associated record of the saved data management table 118b concerning the access-target RAID group, and writes the read-out data together with the data to be written by the present access, in the SSD RAID group. Examples of a write area include a leading portion of an unused or available area of the associated SSD RAID group. Further, the SSD write controller 115a deletes the saved data from the pool area and deletes the record in the saved data management table 118b, which corresponds to the area of the SSD RAID group in which the data has been written. At the same time, the SSD write controller 115a also updates the RAID group information management table 118a. By writing the saved data together with the data to be written by the present access in the SSD RAID group, it is possible to increase the remaining number of records which can be written in the saved data management table 118b, thereby making it possible to suppress the number of written records in the saved data management table 118b from reaching an upper limit of the number of records that can be written therein. After that, the SSD write controller 115a terminates the SSD write control process.

(Step S24) The SSD write controller 115a refers to the column of write access rank of the RAID group information management table 118a, and checks the write access rank of the access-target RAID group, and then the process proceeds to a step S25.

(Step S25) The SSD write controller 115a determines whether or not the operational rank checked in the step S24 is D. If the operational rank checked in the step S24 is D (YES to the step S25), the process proceeds to a step S40. If the operational rank checked in the step S24 is not D (NO to the step S25), the process proceeds to a step S26.

(Step S26) The SSD write controller 115a determines whether or not the operational rank checked in the step S24 is C. If the operational rank checked in the step S24 is C (YES to the step S26), the process proceeds to a step S31. If the operational rank checked in the step S24 is not C (NO to the step S26), the process proceeds to a step S27.

(Step S27) The SSD write controller 115a determines whether or not the operational rank checked in the step S24 is B. If the operational rank checked in the step S24 is B (YES to the step S27), the process proceeds to a step S29. If the operational rank checked in the step S24 is not B (NO to the step S27), the process proceeds to a step S28.

(Step S28) The SSD write controller 115a determines that the operational rank checked in the step S24 is A, and then the process proceeds to a step S33.

(Step S29) The SSD write controller 115a checks a time point when the input/output controller 111 accessed the SSD RAID group last time (last access time). Specifically, the SSD write controller 115a refers to the RAID group information management table 118a, and checks the last write time of the corresponding SSD RAID group, and then the process proceeds to a step S30.

(Step S30) The SSD write controller 115a compares the last write time checked in the step S29 with the current time. Then, the SSD write controller 115a determines whether or not the current time is one day (24 hours) or more after the last write time. If the current time is one day or more after the last write time (YES to the step S30), the process proceeds to the step S40, whereas if not (NO to the step S30), the process proceeds to the step S33.

(Step S31) The SSD write controller 115a checks the time point when the input/output controller 111 accessed the SSD RAID group last time (last access time), similarly to the step S29. Then, the process proceeds to a step S32.

(Step S32) The SSD write controller 115a compares the last access time checked in the step S31 with the current time. Then, the SSD write controller 115a determines whether or not the current time is a half day (12 hours) or more after the last access time. If the current time is a half day or more after the last access time (YES to the step S32), the process proceeds to the step S40, whereas if not (NO to the step S32), the process proceeds to the step S33.

(Step S33) The SSD write controller 115a refers to the saved data management table 118b, to check the remaining number of records in the saved data management table 118b (remaining area of the memory 13 for the management), and then the process proceeds to a step S34.

(Step S34) The SSD write controller 115a determines whether or not the remaining number of the records checked in the step S33 is larger than 0. If the remaining number of the records is larger than 0 (YES to the step S34), the process proceeds to a step S36, whereas if not (NO to the step S34), the process proceeds to a step S35.

(Step S35) The SSD write controller 115a sets the saved data update flag to "on". This saved data update flag is used during the SSD write control process, and is managed e.g. by the memory 13. Then, the process proceeds to the step S23.

(Step S36) The SSD write controller 115a checks on the remaining available area of the pool area, and then the process proceeds to a step S37.

(Step S37) The SSD write controller 115a determines based on a result of the check in the step S36 whether or not data can be stored in the pool area. If data can be stored in the pool area (YES to the step S37), the process proceeds to a step S38, whereas if not (NO to the step S37), the process proceeds to the step S35.

(Step S38) The SSD write controller 115a stores management information of the currently saved data in the saved data management table 118b, and then the process proceeds to a step S39.

(Step S39) The SSD write controller 115a stores the saved data in the pool area, followed by terminating the SSD write control process.

(Step S40) The SSD write controller 115a checks on saved data from the access-target RAID group. Specifically, the SSD write controller 115a refers to the column of save source RLU number in the saved data management table 118b, to check whether or not there is any record of the access-target RAID group, and then the process proceeds to a step S41.

(Step S41) The SSD write controller 115a determines based on a result of the check in the step S40 whether or not there is saved data from the access-target RAID group. If there is saved data from the access-target RAID group (YES to the step S41), the process proceeds to a step S42. If not (NO to the step S41), the process proceeds to a step S43.

(Step S42) The SSD write controller 115a sets the saved data update flag to "on", and then the process proceeds to the step S43.

(Step S43) The SSD write controller 115a performs data writing in the SSD RAID group. This data writing is performed in the same manner as in the data writing in the step S23. Then, the SSD write controller 115a terminates the SSD write control process.

Although in the present embodiment, in the case of the first-time access, the process proceeds to the step S23, wherein the data is written in the SSD RAID group, this is not limitative, but similarly to the case of the update access, it may be determined whether or not the data is to be written in the SSD RAID group according to the frequency of access thereto.

Further, although not illustrated in FIG. 17, when the remaining available area of the pool area for saving data to be stored in the SSD RAID group is insufficient, data low in frequency of update may be written in the SSD RAID group for update, so as to make available the corresponding part of the pool area.

Next, a description will be given of an operating state check and management process executed accompanying the operation of the SSD write control process.

Figure 18:
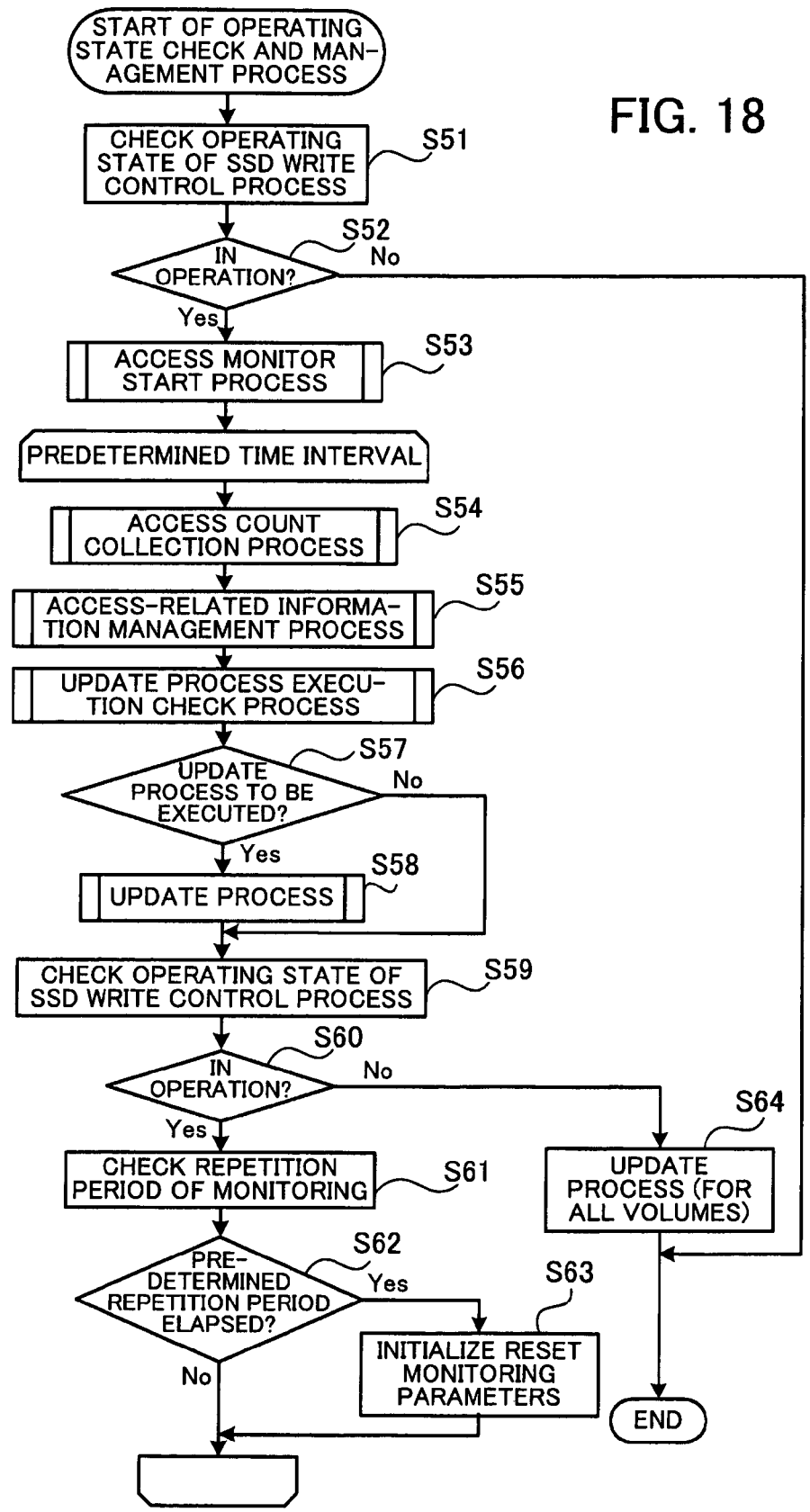
FIG. 18 is a flowchart of an operating state check and management process.

FIG. 18 is a flowchart of the operating state check and management process.

(Step S51) The controller 115 checks an operating state of the SSD write control process, and then the process proceeds to a step S52.

(Step S52) The controller 115 determines based on a result of the check in the step S51 whether or not the SSD write control process is in operation. If the SSD write control process is in operation (YES to the step S52), the process proceeds to a step S53, whereas if not (NO to the step S52), the controller 115 terminates the operating state check and management process.

(Step S53) The access monitor and history management section 115b requests the access information collection section 114 to collect access counts of the accessed data, thereby causing the access information collection section 114 to start collecting the access counts (access monitor start process). This access monitor start process will be described in detail hereinafter with reference to FIG. 19. Then, the process proceeds to a step S54. In the following, steps S54 to S63 are repeatedly executed at intervals of a predetermined time period (e.g. every half day or every day).

(Step S54) The access monitor and history management section 115b collects the access counts collected by the access information collection section 114 in the above-mentioned step S53 (access count collection process). This access count collection process will be described in detail hereinafter with reference to FIG. 20. Then, the process proceeds to a step S55.

(Step S55) The access monitor and history management section 115b executes an access-related information management process.

That is, the access monitor and history management section 115b generates access frequency information based on the access counts collected in the step S54, and stores the generated access frequency information in the access frequency management table 116a. Further, the access monitor and history management section 115b generates access history information indicative of operational ranks, on a data item-by-data item basis, based on the generated access frequency information, and stores the generated access history information in the access history management table 116b (access count and history management process).

The access monitor and history management section 115b further executes a schedule management process and a schedule adjustment process. The access-related information management process realized by the access count and history management process, the schedule management process, and the schedule adjustment process will be described in detail hereinafter with reference to FIGS. 23 to 29. Then the process proceeds to a step S56.

(Step S56) The schedule management and change section 115c checks update process execution flags each indicating that the update process is to be executed for updating data stored in an associated SSD RAID group by saved data therefrom, based on the access history management table 116b (update process execution check process). The update process execution check process will be described in detail hereinafter with reference to FIG. 21. Then, the process proceeds to a step S57.

(Step S57) The schedule management and change section 115c determines whether or not to execute the update process based on the update process execution flags checked in the step S56. If the update process is to be executed (YES to the step S57), the process proceeds to a step S58, whereas if not (NO to the step S57), the process proceeds to a step S59.

(Step S58) The schedule management and change section 115c executes the update process for updating data saved in the SSD RAID group. The update process will be described in detail hereinafter with reference to FIG. 22. After that, the process proceeds to the step S59.

(Step S59) The schedule management and change section 115c checks on the operating state of the SSD write control process. This is for checking whether or not the setting of operation has been canceled during the operation of the SSD write control process. Then, the process proceeds to a step S60.

(Step S60) The schedule management and change section 115c determines based on a result of the check in the step S59 whether or not the SSD write control process is in operation. If the SSD write control process is in operation (YES to the step S60), the process proceeds to a step S61, whereas if not (NO to the step S60), the process proceeds to the step S64.

(Step S61) The access monitor and history management section 115b checks a repetition period of monitoring, and then the process proceeds to a step S62.

(Step S62) The access monitor and history management section 115b determines based on a result of the check in the step S61 whether or not a predetermined period (i.e. the aforementioned predetermined time period) has elapsed after initialization of reset monitoring parameters, referred to hereinafter in a step S63. If the predetermined period has elapsed (YES to the step S62), the process proceeds to the step S63, whereas if not (NO to the step S62), the process returns to the step S54 in a manner timed to the interval of the predetermined time period.

(Step S63) The access monitor and history management section 115b initializes the reset monitoring parameters, i.e. the parameters of the access counter 114a, the access frequency management table 116a, and the access history management table 116b. Then, the process returns to the step S54 in a manner timed to the interval of the predetermined time period.

(Step S64) In order to terminate the operation of the SSD write control process, the schedule management and change section 115c executes the update process for writing data currently saved in the pool area back into the SSD RAID groups, on all the storage devices having pool areas. Then, the operating state check and management process is terminated.

Next, a description will be given of the access monitor start process executed in the step S53.

<Access Monitor Start Process>

Figure 19:
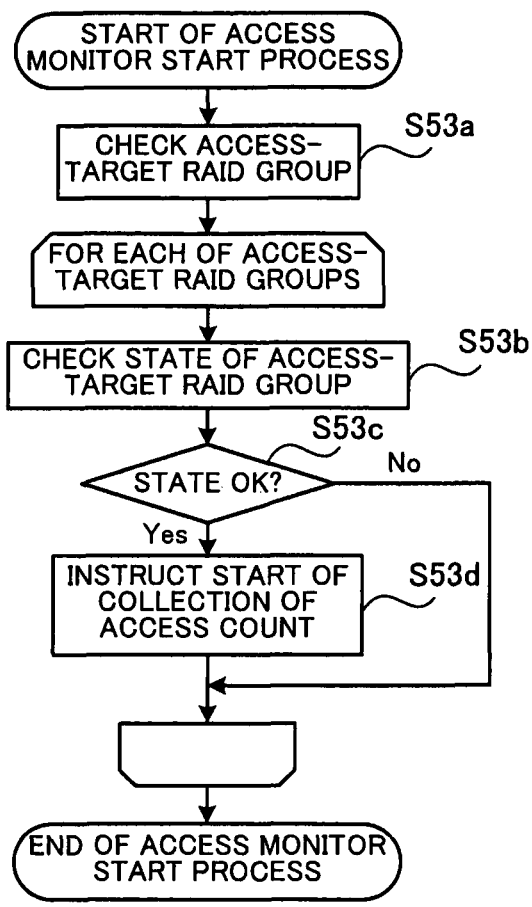
FIG. 19 is a flowchart of an access monitor start process.

FIG. 19 is a flowchart of the access monitor start process (S53).

(Step S53a) The access monitor and history management section 115b checks RAID groups as monitoring targets (monitoring-target RAID groups; in the present embodiment, all RAID groups each having the possibility of being accessed), and then the process proceeds to a step S53b. In the following, the access monitor and history management section 115b repeatedly executes steps S53b to S53d on each monitoring-target RAID group.

(Step S53b) The access monitor and history management section 115b checks the mounted state and in-operation state of one of the monitoring-target RAID groups checked in the step S53a, and then the process proceeds to a step S53c.

(Step S53c) The access monitor and history management section 115b determines whether or not the mounted state and the in-operation state checked in the step S53b are OK (without abnormality). Here, the term "abnormality" is intended to mean an unmounted state of the monitoring-target RAID group, occurrence of failure therein, a power-off state thereof, etc.

If the mounted state and the operating state are OK (YES to the step S53c), the process proceeds to the step S53d, whereas if not (NO to the step S53c) and if there is a monitoring-target RAID group which has not been subjected to the check of the mounted state and in-operation state (state check) yet, the process returns to the step S53b, to execute the step S53b et seq. on the monitoring-target RAID group. If all the monitoring-target RAID groups have been subjected to the check, the present access monitor start process is terminated.

(Step S53d) The access monitor and history management section 115b requests the access information collection section 114 to start collection of the access counts of the monitoring-target RAID group of which the mounted state and in-operation state have been determined to be OK. After that, if there is a monitoring-target RAID group which has not been subjected to the state check yet, the process returns to the step S53b to execute the step S53b et seq. on the monitoring-target RAID group. If all the monitoring-target RAID groups have been subjected to the state check, the access monitor start process is terminated.

Next, a description will be given of the access count collection process executed in the step S54.

<Access Count Collection Process>

Figure 20:
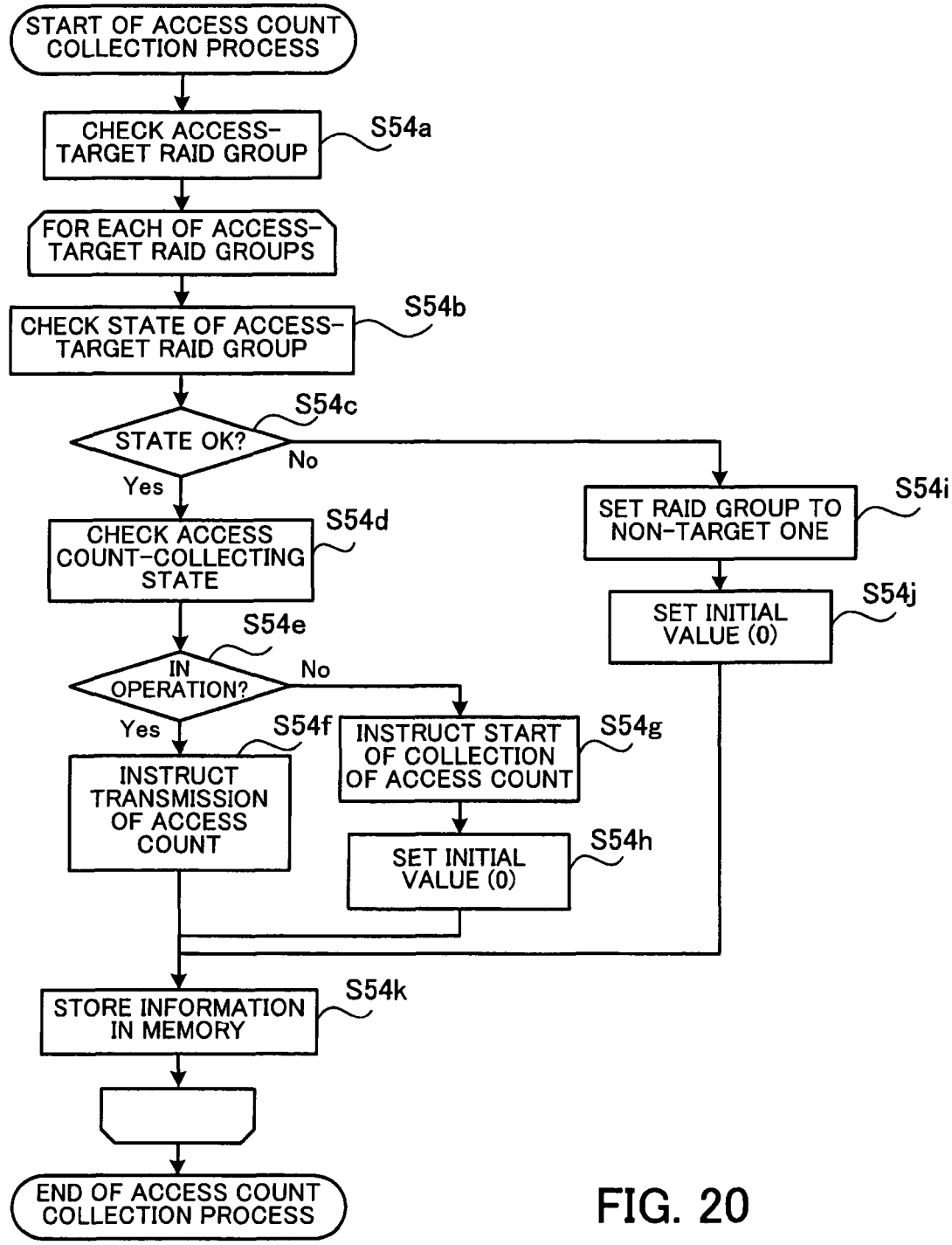
FIG. 20 is a flowchart of an access count collection process.

FIG. 20 is a flowchart of the access count collection process (S54).

(Step S54a) The access monitor and history management section 115b checks on monitoring-target RAID groups, and then the process proceeds to a step S54b. In the following, the controller 115 repeatedly executes steps S54b to S54k on each access-target RAID group at predetermined intervals of a short time period (e.g. one minute).

(Step S54b) The access monitor and history management section 115b checks the mounted state and in-operation state of one of the access-target RAID groups checked in the step S54a, and then the process proceeds to a step S54c.

(Step S54c) The access monitor and history management section 115b determines whether or not the mounted state and in-operation state checked in the step S54b are OK. If the mounted state and in-operation state are OK (YES to the step S54c), the process proceeds to a step S54d, whereas if not (NO to the step S54c), the process proceeds to a step S54i.

(Step S54d) The access monitor and history management section 115b checks an access count-collecting state of the access information collection section 114. More specifically, the access monitor and history management section 115b checks e.g. whether or not the access information collection section 114 has changed the storage device 211a or the like from an unmounted state to a mounted state thereof, or whether or not a restart process performed when the storage device 211a or the like has been restored from a failure is being performed.

(Step S54e) The access monitor and history management section 115b determines, based on the state of the access information collection section 114 checked in the step S54d, whether or not the collection process by the access information collection section 114 is in operation. If the collection process is in operation (YES to the step S54e), the process proceeds to a step S54f, whereas if not (NO to the step S54e), the process proceeds to a step S54g.

(Step S54f) The access monitor and history management section 115b instructs the access information collection section 114 to transmit an access count collected by the same, and then the process proceeds to the step S54k.

(Step S54g) If the collection process by the access information collection section 114 is not in operation, the access monitor and history management section 115b instructs the access information collection section 114 to start collecting an access count again. Then, the process proceeds to a step S54h.

(Step S54h) The access monitor and history management section 115b sets the initial value of the access count to 0, and then the process proceeds to the step S54k.

(Step S54i) The access monitor and history management section 115b determines that the monitoring-target RAID group of which the mounted state and the operating state have been determined not to be OK is in abnormality, and is a non-target RAID group. Then, the process proceeds to a step S54j.

(Step S54j) The access monitor and history management section 115b sets the initial value of the access count of the non-target RAID group to 0, and then the process proceeds to the step S54k.

(Step S54k) The access monitor and history management section 115b temporarily stores the collected access count in the memory 13. Then, if there is a monitoring-target RAID group which has not been subjected to the above-described access count collection process yet, the process returns to the step S54b to execute the step S54b et seq. on the monitoring-target RAID group. If the access count collection process has been executed on all the monitoring-target RAID groups, the access monitor and history management section 115b terminates the access count collection process.

Next, a description will be given of the update process execution check process executed in the step S56.

<Update Process Execution Check Process>

Figure 21:
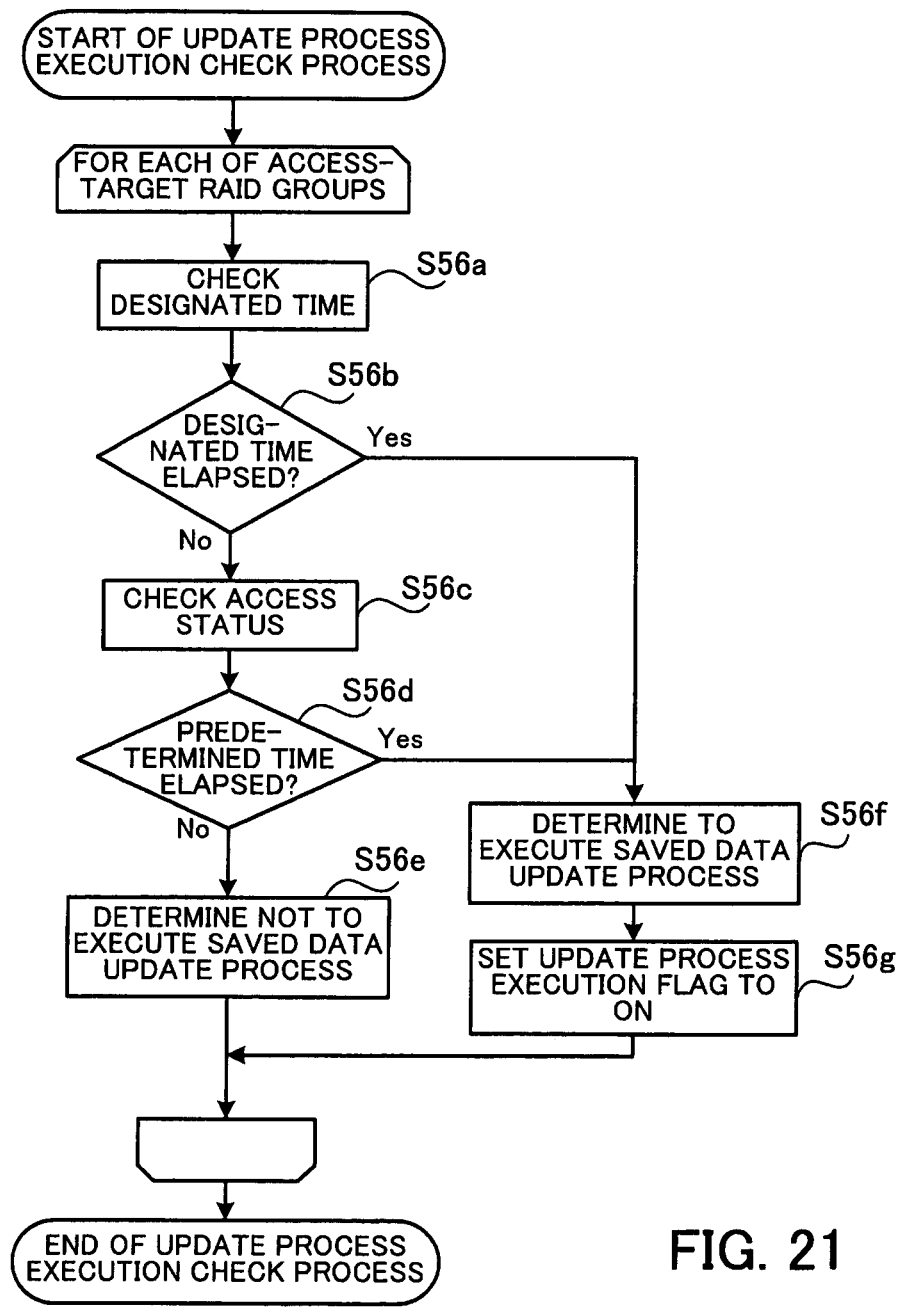
FIG. 21 is a flowchart of an update process execution check process.

FIG. 21 is a flowchart of the update process execution check process (S56).

In the following, the controller 115 repeatedly executes steps S56a to S56g on each of SSD RAID groups as monitoring targets (monitoring-target SSD RAID groups).

(Step S56a) The schedule management and change section 115c checks a time designated by the user. The user can designate the time in units of hours, minutes, and seconds. The time can be designated e.g. as 13:35:34 in a 24-hour format. After that, the process proceeds to a step S56b.

(Step S56b) The schedule management and change section 115c compares the designated time checked in the step S56a with the current time, to determine whether or not the designated time has passed. If the designated time has passed (YES to the step S56b), the process proceeds to a step S56f, whereas if not (NO to the step S56b), the process proceeds to a step S56c.

(Step S56c) The schedule management and change section 115c checks a state of access to the monitoring-target RAID group. Specifically, the schedule management and change section 115c refers to the column of write access rank of the RAID group information management table 118a, and acquires the operational rank of the monitoring-target SSD RAID group, and then the process proceeds to a step S56d.

(Step S56d) The schedule management and change section 115c determines whether or not a predetermined time period has elapsed. Specifically, the schedule management and change section 115c refers to the column of last write time of the RAID group information management table 118a, and determines whether or not the predetermined time period, which is associated with the operational rank of the monitoring-target SSD RAID group acquired in the step S56c, has elapsed after a last write time written in the RAID group information management table 118a in association with the monitoring-target SSD RAID group. If the predetermined time period associated the acquired operational rank has elapsed after the last write time (YES to the step S56d), the process proceeds to the step S56f, whereas if not (NO to the step S56d), the process proceeds to a step S56e.

(Step S56e) The schedule management and change section 115c determines that the update process for updating data stored in the monitoring-target SSD RAID group by saved data is not to be executed. Then, if there is a monitoring-target SSD RAID group which has not been subjected to the update process execution check process yet, the process returns to the step S56a to execute the step S56a et seq. on the monitoring-target SSD RAID group. If the update process execution check process has been executed on all the monitoring-target SSD RAID groups, the update process execution check process is terminated.

(Step S56f) The schedule management and change section 115c determines that the update process for updating the data stored in the monitoring-target SSD RAID group by the saved data is to be executed, and then the process proceeds to the step S56g.

(Step S56g) The schedule management and change section 115c sets an update process execution flag associated with the monitoring-target SSD RAID group to "on". This update process execution flag is stored e.g. in the memory 13. Then, if there is a monitoring-target SSD RAID group which has not been subjected to the update process execution check process yet, the process returns to the step S56a to execute the step S56a et seq. on the monitoring-target SSD RAID group. If the update process execution check process has been executed on all the monitoring-target SSD RAID groups, the update process execution check process is terminated.

Next, a description will be given of the update process executed in the step S58.

<Update Process>

Figure 22:
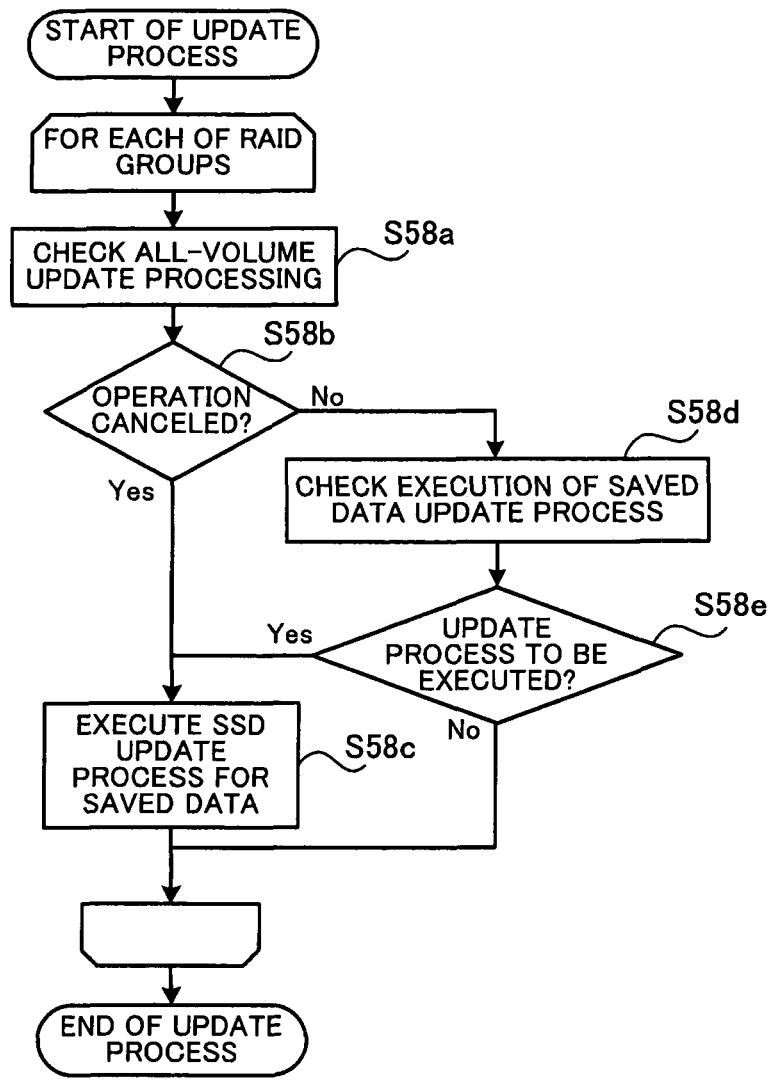
FIG. 22 is a flowchart of an update process.

FIG. 22 is a flowchart of the update process (S58).

(Step S58a) The schedule management and change section 115c checks whether or not the operation of the SSD write control process is to be stopped and hence all the volumes are to be updated, that is, whether or not the aforementioned step S64 is to be executed. Then, the process proceeds to a step S58b.

(Step S58b) The schedule management and change section 115c determined based on a result of the check in the step S58a whether or not the operation of the SSD write control process is to be stopped. If it is determined that the operation of the SSD write control process is to be stopped (YES to the step S58b), the process proceeds to a step S58c, whereas if not (NO to the step S58b), the process proceeds to a step S58d.

(Step S58c) The schedule management and change section 115c requests the SSD write controller 115a to execute an SSD update process for updating data stored in an SSD RAID group by saved data therefrom. Specifically, the schedule management and change section 115c requests the SSD write controller 115a to write the saved data in the SSD RAID group and initialize the saved data management table 118b. Then, if there is any SSD RAID group which is to be subjected to but has not been subjected to the SSD update process yet, the process returns to the step S58a to execute the step S58a et seq. on the SSD RAID group. If the SSD update process has been executed on all the SSD RAID groups, the present update process is terminated.

(Step S58d) The schedule management and change section 115c checks whether or not the aforementioned SSD update process is to be executed. Specifically, the schedule management and change section 115c refers to the memory 13 to check an update process execution flag for an SSD RAID group set in the step S56g, and then the process proceeds to a step S58e.

(Step S58e) The schedule management and change section 115c determines based on a result of the check in the step S58d whether or not the update process is to be executed on the SSD RAID group. Specifically, when the update process execution flag for the SSD RAID group checked in the step S58d is "on" (YES to the step S58e), the process proceeds to the step S58c. When the update process execution flag for the SSD RAID group is "off" (NO to the step S58e), and if there is an SSD RAID group which is to be subjected to the SSD update process but has not been subjected thereto yet, the process returns to the step S58a to execute the step S58a et seq. on the SSD RAID group. If the update process has been executed on all the SSD RAID groups to be subjected to the SSD update process, the present update process is terminated.

Next, a description will be given of the access-related information management process executed in the step S55 in FIG. 18. As mentioned hereinabove, this process is realized by the following three processes: the access count and history management process, the schedule management process, and the schedule adjustment process. Hereinafter, the processes will be described in detail in the mentioned order.

<Access Count and History Management Process>

Figure 23:
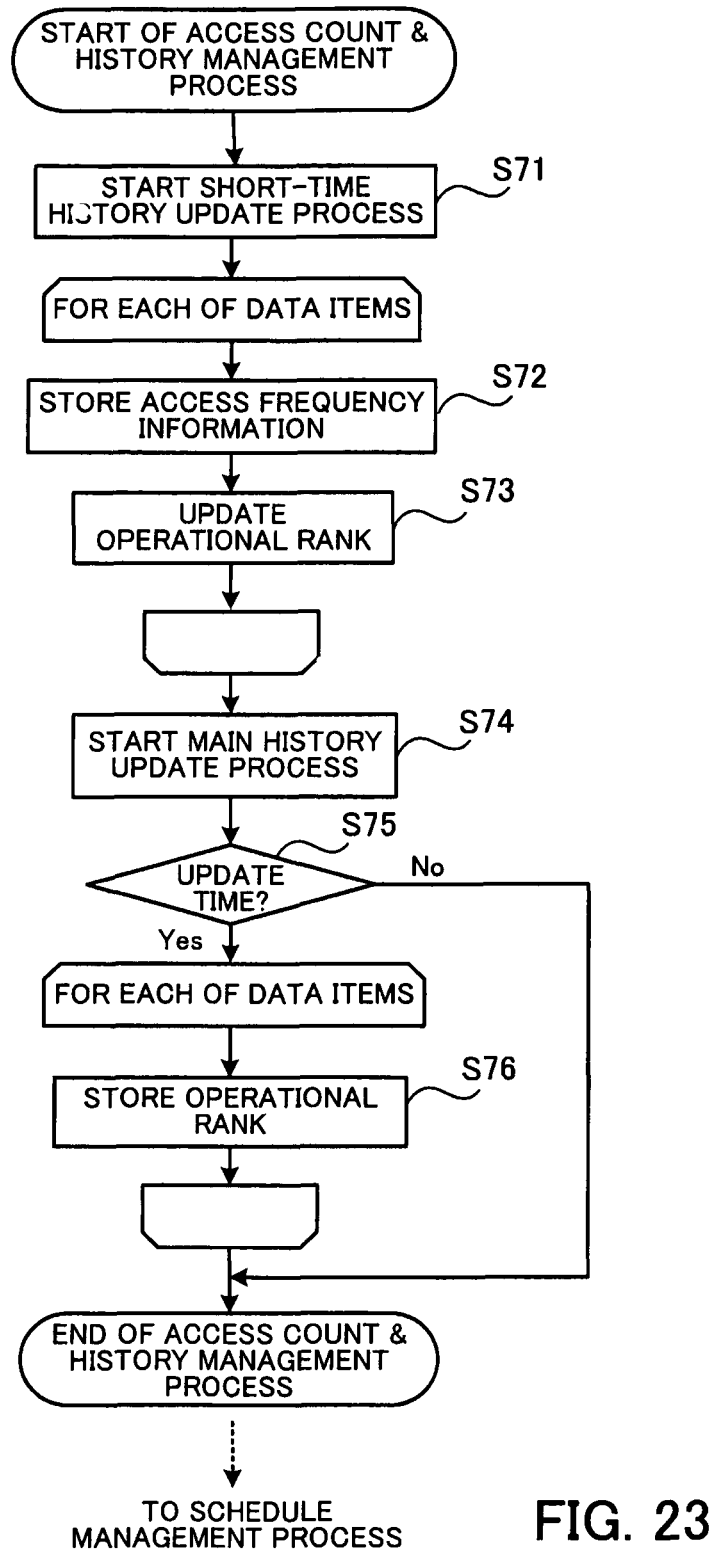
FIG. 23 is a flowchart of an access count and history management process.

FIG. 23 is a flowchart of the access count and history management process.

(Step S71) The access monitor and history management section 115b starts a short-time history update process. Here, the term "short-time history update process" is intended to mean a process for forming information in the access history management table 116b as illustrated in FIG. 7, based on information on access counts collected by the access information collection section 114 and temporarily stored in the access counter 114a as illustrated in FIG. 5. More specifically, the information on access counts is transmitted from the access information collection section 114 in response to the instruction for the transmission thereof in the step S54f of the access count collection process in FIG. 20, at intervals of a predetermined time period (e.g. one minute), and is written as access frequency information in the access frequency management table 116a as illustrated in FIG. 6. The short-time history update process is intended to mean a process for compiling the access frequency information into a count and an operational rank in the access history management table 116b as illustrated in FIG. 7 for each data item, on a predetermined time zone basis (in the illustrated example, every 30 minutes from 0' clock). To this end, the short-time history update process executes a step S72 and then a step S73 described hereafter. More specifically, the access monitor and history management section 115b repeatedly executes the step S72 and the step S73, a number of times corresponding to the number of data items to be processed, i.e. the number of target data items.

(Step S72) Based on the access frequency information in the access frequency management table 116a as illustrated in FIG. 6, the access monitor and history management section 115b calculates the number of accesses for the immediately preceding time zone of 30 minutes on the target data item as the count. The access monitor and history management section 115b writes the count in the access frequency management table 116b, and then the process proceeds to the step S73.

(Step S73) The access monitor and history management section 115b determines an operational rank (one of A to D) of the target data item at the current time point according to the count written in the access history management table 116b in the step S72, and temporarily stores the operational rank in the memory 13.

After the access monitor and history management section 115b executes the above-described steps S72 and S73 the number of times corresponding to the number of target data items, the process proceeds to a step S74.

(Step S74) The access monitor and history management section 115b starts a main history update process. Here, the term "main history update process" is intended to mean a process in which operational ranks for every time zone of 30 minutes which have been accumulated over a half day are collectively stored in the access history management table 116b on a data item-by-data item basis. To this end, the following steps S75 and S76 are executed.

(Step S75) The access monitor and history management section 115b determines whether or not the current time point is time for update of operational ranks, i.e. a time when items of access history information (operational ranks) for a half day are to be stored in the access history management table 116b. In other words, the access monitor and history management section 115b determines whether or not the items of access history information (operational ranks) for a half day have already been accumulated. If the current time point is for update (YES to the step S75), the process proceeds to a step S76, whereas if not (NO to the step S75), the access count and history management process is immediately terminated.

(Step S76) The access monitor and history management section 115b stores the items of access history information (operational ranks) on a data item for every time zone of 30 minutes which have been accumulated over a half day in the memory 13, in the access history management table 116b. The access monitor and history management section 115b executes the step S76 for each data item, followed by terminating the access count and history management process.

Next, a description will be given of the schedule management process.

<Schedule Management Process>

Figure 24:
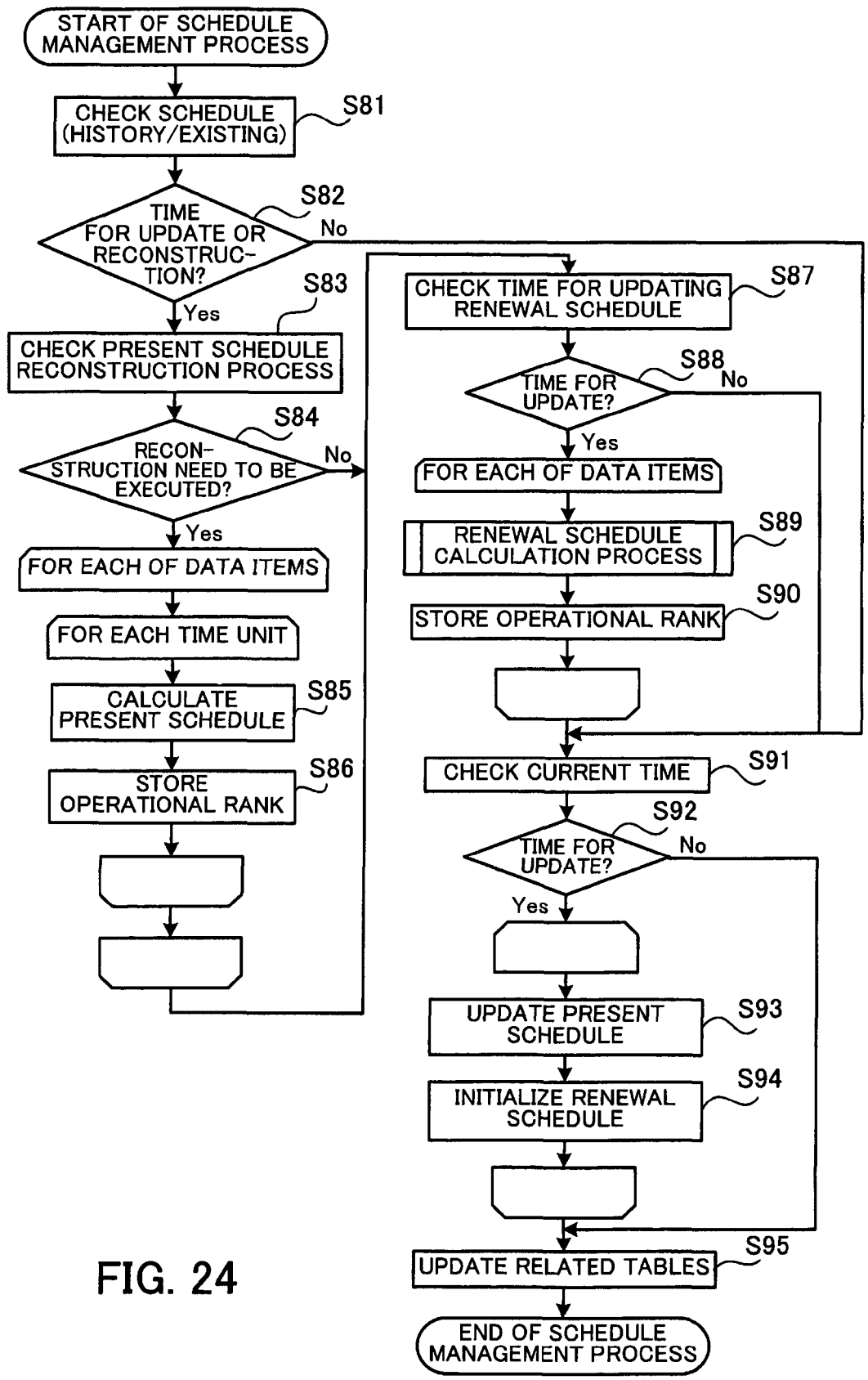
FIG. 24 is a flowchart of a schedule management process.

FIG. 24 is a flowchart of the schedule management process.

(Step S81) The schedule management and change section 115c checks a schedule (history and existing information). This check of the schedule is performed for checking and updating the present schedule (present operational rank) in each schedule management table 117a illustrated in FIG. 8 generated based on existing history information (access statuses).

(Step S82) The schedule management and change section 115c determines whether or not it is time to update or reconstruct the present schedule. If it is time to update or reconstruct the present schedule (YES to the step S82), the process proceeds to a step S83, whereas if not (NO to the step S82), the process proceeds to a step S91.

(Step S83) The schedule management and change section 115c checks on a reconstruction process for the present schedule, and then the process proceeds to a step S84.

(Step S84) The schedule management and change section 115c determines based on the check in the step S83 whether or not the reconstruction process needs to be executed. The reconstruction process needs to be executed e.g. when the control module 10a or the like has been reset, or when there is no history or schedules. If the reconstruction process needs to be executed (YES to the step S84), the process proceeds to a step S85, whereas if not (NO to the step S84), the process proceeds to a step S87. To execute the reconstruction process, the schedule management and change section 115c repeatedly executes the step S85 and a step S86 for each of 30-minute time zones of a half day, for each of target data items (data items for which the schedule management process are to be executed).

(Step S85) The schedule management and change section 115c calculates an operational rank for a time zone in the column of present schedule (present operational rank) of the schedule management table 117a illustrated in FIG. 8, based on history information other than history information for the processing day, stored in the access information storage section 116. The processing in the step S85 will be described in detail hereinafter by referring to a renewal schedule calculation process. Then, the process proceeds to the step S86.

(Step S86) The schedule management and change section 115c stores the operational ranks calculated in the step S85 in the schedule management table 117a.

The schedule management and change section 115c executes the processing in the steps S85 and S86 for each data item for each of 30-minute time zones of a half day, and then the process proceeds to a step S88.

(Step S87) The schedule management and change section 115c checks an update time for updating a renewal schedule, i.e. the column of renewal operational rank of the schedule management table 117a, and then the process proceeds to a step S88.

(Step S88) The schedule management and change section 115c determines whether or not it is time to update the renewal schedule, based on the update time checked in the step S87. If it is time to update the renewal schedule (YES to the step S88), the process proceeds to a step S89, whereas if not (NO to the step S88), the process proceeds to the step S91. In the following, the schedule management and change section 115c repeatedly executes the step S89 and a step S90 for each target data item.

(Step S89) The schedule management and change section 115c executes the renewal schedule calculation process to generate a renewal schedule for a target data item. More specifically, the schedule management and change section 115c calculates a renewal operational rank, based on history information in the past (present operational rank) and history information for the processing day (today operational rank) stored in the schedule management table 117a. That is, the schedule management and change section 115c newly sets the renewal operational rank using the history information for the processing day (today operational rank) to thereby update the schedule management table 117a for the data item. This process will be described in detail hereinafter.

(Step S90) The schedule management and change section 115c stores the operational ranks calculated for respective time zones in respective associated boxes in the column of renewal operational rank of the schedule management table 117a.

The schedule management and change section 115c repeatedly executes the processing in the steps S89 and S90 the number times corresponding to the number of target data items, and then the process proceeds to the step S91.

(Step S91) The schedule management and change section 115c checks the current time point, and then the process proceeds to a step S92.

(Step S92) The schedule management and change section 115c determines whether or not the current time point checked in the step S91 is time for updating the schedules to latest information, i.e. whether or not to update the operational ranks in the column of present operational rank of the schedule management table 117a to the operational ranks in the column of renewal operational rank of the same. If it is determined that it is time for updating the schedules (YES to the step S92), the process proceeds to a step S93, whereas if not (NO to the step S92), the schedule management and change section 115c terminates the schedule management process. The schedule management and change section 115c repeatedly executes the following steps S93 and S94 for each of the target data items.

(Step S93) The schedule management and change section 115c updates the operational ranks in the column of present operational rank of the schedule management table 117a to the operational ranks in the column of renewal operational rank, which have been updated (stored) in the step S90, i.e. overwrites the former with the latter. Then, the process proceeds to the step S94.

(Step S94) The schedule management and change section 115c initializes the schedule i.e. the operational ranks in the column of renewal operational rank of the schedule management table 117a.

The schedule management and change section 115c repeatedly executes the processing in the steps S93 and S94 the number times corresponding to the number of target data items, and then the process proceeds to a step S95.

(Step S95) The schedule management and change section 115c integrates the operational ranks of the renewal schedule thus formed for all the target data items into operational ranks and stores the operational ranks in the column of renewal operational rank in the column of operational rank of the schedule adjustment management table 117b. Furthermore, the schedule management and change section 115c stores the operational ranks in the column of renewal operational rank also in the column of write access rank of the RAID group information management table 118a. Then, the schedule management process is terminated.

When the schedule management process is terminated, the schedule adjustment process is executed.

Next, the renewal schedule calculation process executed, in the step S89 will be described in detail.

<Update Schedule Calculation Process>

Figure 25:
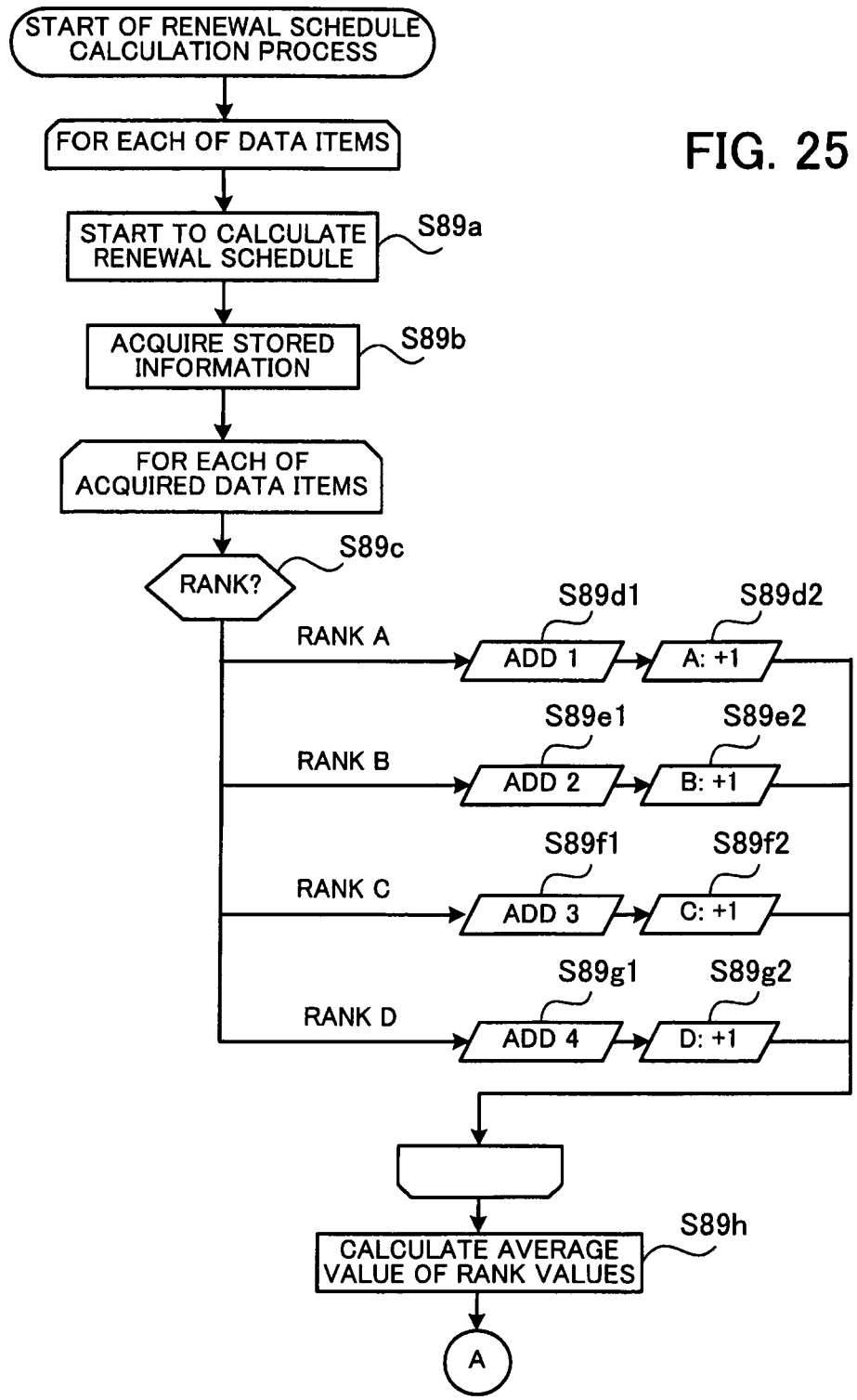
FIG. 25 is a flowchart of a renewal schedule calculation process.
Figure 26:
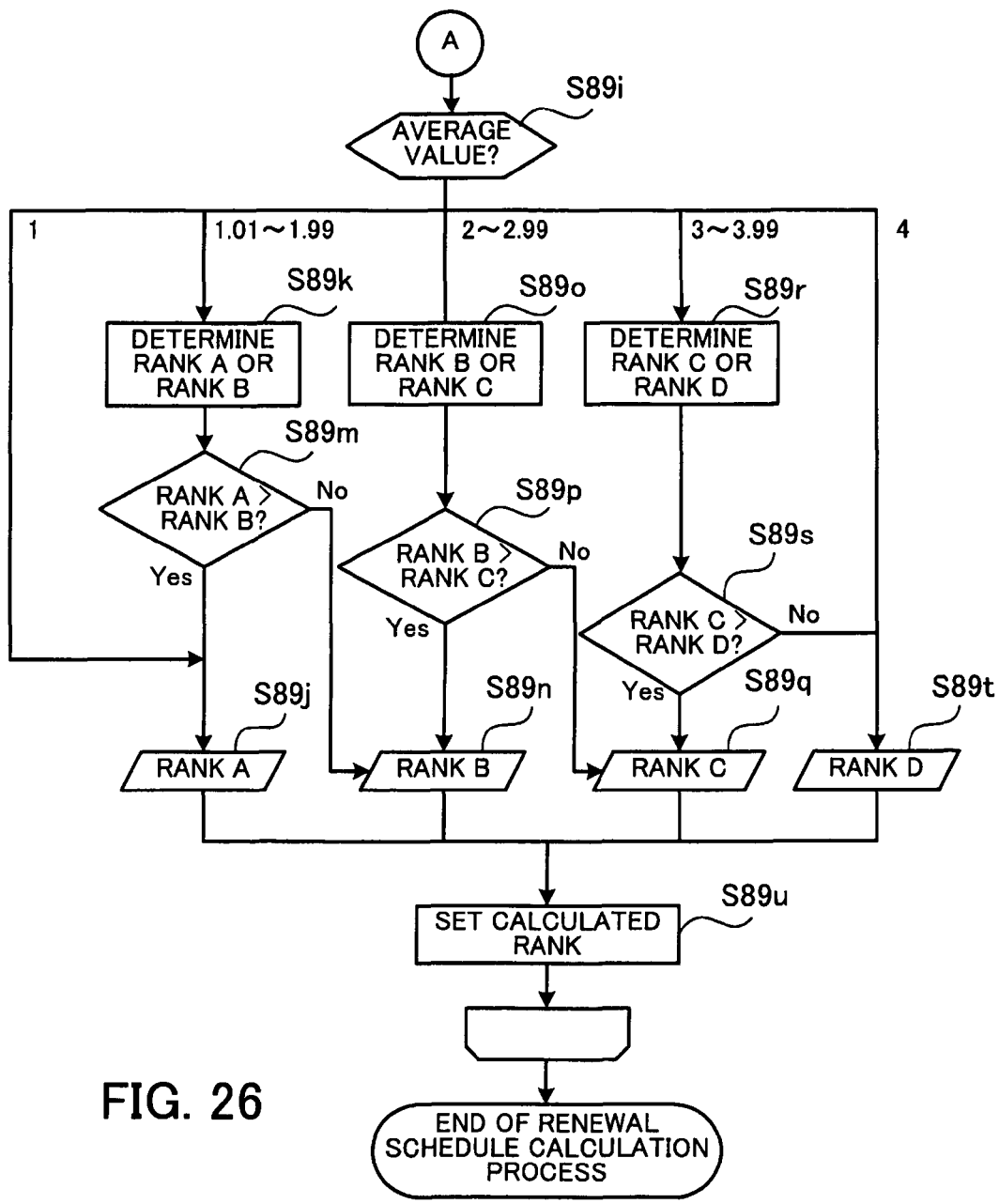
FIG. 26 is a continuation of FIG. 25.

FIGS. 25 and 26 are flowcharts of the renewal schedule calculation process. In FIGS. 25 and 26, the operational ranks are simply denoted as "ranks".

In the renewal schedule calculation process, values for calculation based on the operational ranks (hereinafter referred to as the "rank values") and the counts of appearances of the operational ranks A, B, C, and D (hereinafter referred to as the "operational rank counts") are managed.

At the start of the FIG. 25 update schedule calculation process, the initial values of the "rank values" and those of the "operational rank counts" are set to 0, respectively.

The schedule management and change section 115c repeatedly executes the renewal schedule calculation process for each target data item by executing the following steps S89a to S89u to thereby calculate an operational rank (A to D) for every predetermined time zone (every 30 minutes from 0 o'clock in the illustrated example) as a corresponding operational rank of the renewal schedule, i.e. an operational rank of the data item for each predetermined time zone in the column of update operational rank of the schedule management table 117a in FIG. 8.

(Step S89a) The schedule management and change section 115c starts processing to calculate the operational ranks of the renewal schedule of a target data item. Then, the process proceeds to a step S89b.

(Step S89b) The schedule management and change section 115c acquires all history information (present operational ranks and today operational ranks stored in the schedule management table 117a: stored data) of the target data item. Then, to repeatedly execute the following steps S89c to S89g2 on two types of acquired data i.e. present and today operational ranks of each time zone to thereby calculate the renewal operational rank in the time zone of the schedule management table 117a in FIG. 8, the process proceeds to a step S89c.

It should be noted that the schedule management and change section 115c may be configured to acquire not all history information of the target data item but only predetermined information, in the step S89b. For example, the schedule management and change section 115c may acquire, of all history information, present and today operational ranks in time zones for which a renewal schedule is to be generated.

(Step S89c) Of all the data (present operational ranks and today operational ranks) acquired in the step S89a, the schedule management and change section 115c checks on an operational rank (one of a present operational rank and a today operational rank) of a time zone. If the operational rank in the time zone is A, the process proceeds to a step S89d1. If the operational rank is B, the process proceeds to a step S89e1. If the present operational rank is C, the process proceeds to a step S89f1. If the present operational rank is D, the process proceeds to a step S89g1. Further, the schedule management and change section 115c checks the other operational rank (the other of the present operational rank and the today operational rank) of the time zone. If the operational rank in the time zone is A, the process proceeds to the step S89d1. If the operational rank is B, the process proceeds to the step S89e1. If the present operational rank is C, the process proceeds to the step S89f1. If the present operational rank is D, the process proceeds to the step S89g1.

(Step S89d1) The schedule management and change section 115c adds 1 to the rank value, and then the process proceeds to the step S89d2.

(Step S89d2) The schedule management and change section 115c adds 1 to the count of the operational rank A, and then the process proceeds to a step S89h.

(Step S89e1) The schedule management and change section 115c adds 2 to the rank value, and then the process proceeds to the step S89e2.

(Step S89e2) The schedule management and change section 115c adds 1 to the count of the operational rank B, and then the process proceeds to the step S89h.

(Step S89f1) The schedule management and change section 115c adds 3 to the rank value, and then the process proceeds to the step S89f2.

(Step S89f2) The schedule management and change section 115c adds 1 to the count of the operational rank C, and then the process proceeds to the step S89h.

(Step S89g1) The schedule management and change section 115c adds 4 to the rank value, and then the process proceeds to the step S89g2.

(Step S89g2) The schedule management and change section 115c adds 1 to the count of the operational rank D, and then the process proceeds to the step S89h.

(Step S89h) When execution of relevant ones of the steps S89e1 to S89g2 on the acquired data (the pair of present and today operational ranks of the time zone) is completed, the schedule management and change section 115c calculates an average value of two rank values calculated for the pair of operational ranks respectively. More specifically, the schedule management and change section 115c calculates the average value by dividing the sum of the calculated rank values by the number of the operational ranks used for the calculation, i.e. 2.

For example, taking the schedule management table 117a of FIG. 8 as an example, the operational ranks in a time zone of 00:00:00 to 00:30:00 in the respective columns of present operational rank and today operational rank are B and A.

Assuming that the present operational rank is first subjected to the calculation processing and the today operational rank is subjected to the calculation processing, since the present operational rank is A, the schedule management and change section 115c adds 1 to the rank value and adds 1 to the count of the operational rank A. As a consequence, the rank value becomes equal to 1, the count of the operational rank A becomes equal to 1, and the counts of the other operational ranks become equal to 0.

Since the today operational rank is B, the schedule management and change section 115c adds 2 to the rank value, and adds 1 to the count of the operational rank B. As a consequence, the rank value becomes equal to 3, the count of the operational rank A is equal to 1, the count of the operational rank B becomes equal to 1, and the counts of the other operational ranks become equal to 0.

Since the execution of the calculation processing on the acquired data (the present operational rank and the today's operational rank) in the steps S89$e$1 to S89$g$2 is completed, the schedule management and change section 115$c$ divides the calculated rank value of 3 by the number of operational rank 2 to calculate an average value 1.5.

Then, the process proceeds to a step S89$i$.

(Step S89$i$) The schedule management and change section 115$c$ determines in which range of a plurality of ranges of values set in advance, the calculated average value of the rank values falls. If the average value is equal to 1 (1 in the step S89$i$), the process proceeds to a step S89$j$. If the average value is 1.01 to 1.99 (1.01 to 1.99 in the step S89$i$), the process proceeds to a step S89$k$. If the average value is 2 to 2.99 (2 to 2.99 in the step S89$i$), the process proceeds to a step S89$o$. If the average value is 3 to 3.99 (3 to 3.99 in the step S89$i$), the process proceeds to a step S89$r$. If the average value is 4 (4 in the step S89$i$), the process proceeds to a step S89$t$.

(Step S89$j$) The schedule management and change section 115$c$ determines that the operational rank in the time zone of the target data item is A, and then the process proceeds to a step S89$u$.

(Step S89$k$) The schedule management and change section 115$c$ determines to perform a determination process for determining whether the operational rank in the time zone of the target data item is A or B, and then the process proceeds to a step S89$m$.

(Step S89$m$) The schedule management and change section 115$c$ determines an operational rank based on the counts of the operational ranks calculated in the steps S89$d$1 to S89$g$2. Specifically, the schedule management and change section 115$c$ compares the count of the operational rank A and the sum of counts of the respective operational ranks B to D to which weights are applied (step S89$m$; denoted as "RANK A>RANK B?" in FIG. 26). If the count of the operational rank A is larger (YES to the step S89$m$), the process proceeds to the step S89$j$, whereas if the count of the operational rank A is not larger (NO to the step S89$m$), the process proceeds to a step S89$n$.

In doing this, by setting a weighting coefficient assigned to the operational ranks A and B to 1, a weighting coefficient assigned to the operational rank C to 1.25, and a weighting coefficient assigned to the operational rank D to 1.5, the schedule management and change section 115$c$ determines in the step S89$m$ whether or not the following equation (1) is satisfied.

$$\text{count of operational rank } A > \text{count of operational rank } B + \text{count of operational rank } C \times 1.25 + \text{count of operational rank } D \times 1.5 \quad (1)$$

(Step S89$n$) The schedule management and change section 115$c$ determines that the operational rank in the time zone of the target data item is B, and then the process proceeds to step S89$u$.

(Step S89$o$) The schedule management and change section 115$c$ determines to perform a determination process for determining whether the operational rank in the time zone of the target data item is B or C, and then the process proceeds to a step S89$p$.

(Step S89$p$) The schedule management and change section 115$c$ determines the operational rank in the time zone of the target data item based on the counts of the respective operational ranks calculated in the steps S89$d$1 to S89$g$2.

Specifically, the schedule management and change section 115$c$ compares the sum of counts of the operational ranks A and B to which weights are applied and the sum of counts of the operational ranks C and D to which weights are applied (step S89$p$; denoted as "RANK B>RANK C?" in FIG. 26). If the sum of counts of the operational ranks A and B is larger (YES to the step S89$p$), the process proceeds to the step S89$n$, whereas if the sum of counts of the operational ranks A and B is not larger (NO to the step S89$p$), the process proceeds to a step S89$q$.

In doing this, by setting a weighting coefficient assigned to the operational ranks A and D to 1.25, and a weighting coefficient assigned to the operational ranks B and C to 1, the schedule management and change section 115$c$ determines in the step S89$p$ whether or not the following equation (2) is satisfied.

$$\text{count of operational rank } A \times 1.25 + \text{count of operational rank } B > \text{count of operational rank } C + \text{count of operational rank } D \times 1.25 \quad (2)$$

(Step S89$q$) The schedule management and change section 115$c$ determines that the operational rank in the time zone of the target data item is C, and then the process proceeds to the step S89$u$.

(Step S89$r$) The schedule management and change section 115$c$ determines to perform a determination process for determining whether the operational rank in the time zone of the target data item is C or D, and then the process proceeds to a step S89$s$.

(Step S89$s$) The schedule management and change section 115$c$ determines the operational rank in the time zone of the target data item, based on the counts of the respective operational ranks calculated in the steps S89$d$1 to S89$g$2.

Specifically, the schedule management and change section 115$c$ compares the sum of counts of the operational ranks A to C to which weights are applied and the count of the operational rank D (step S89$s$; denoted as "RANK C>RANK D?" in FIG. 26). If the sum of counts of the operational ranks A to C is larger (YES to the step S89$s$), the process proceeds to the step S89$q$, whereas if the sum of counts of the operational ranks A to C is not larger (NO to the step S89$s$), the process proceeds to the step S89$t$.

In doing this, by setting a weighting coefficient assigned to the operational rank A to 1.5, a weighting coefficient assigned to the operational rank B to 1.25, and a weighting coefficient assigned to the operational ranks C and D to 1, the schedule management and change section 115$c$ determines in the step S89$s$ whether or not the following equation (3) is satisfied.

$$\text{count of operational rank } A \times 1.5 + \text{count of operational rank } B \times 1.25 + \text{count of operational rank } C > \text{count of operational rank } D \quad (3)$$

(Step S89$t$) The schedule management and change section 115$c$ determines that the operational rank in the time zone of the target data item is D, and then the process proceeds to the step S89$u$.

(Step S89$u$) The schedule management and change section 115$c$ sets (or stores) the above determined operational rank as a renewal operational rank in the time zone of the schedule management table 117$a$ in FIG. 8.

The schedule management and change section 115$c$ executes the above-described steps S89$a$ to S89$u$ for each of the target data items, followed by terminating the renewal schedule calculation process.

As described hereinabove, in calculating update operational ranks based on history information (present and today operational ranks), the schedule management and change section 115c calculates the renewal operational ranks not only by simply using the average value of values unconditionally given to the present and today operational ranks, but also by using values calculated by assigning weights to the counts of the respective operational ranks, so that it is possible to give the data items correct priorities in accordance with the tendencies of past access to the data items (calculate the renewal operational ranks), thereby making it possible to use the memory 13 more effectively.

More specifically, the schedule management and change section 115c is configured to perform judgment on an operational rank determined based on the average value of values indicative of operational ranks based on history information, using weighted counts of different operational ranks from the operational rank itself, to thereby correct the operational rank according to the frequency of occurrence of each operational rank. This makes it possible to rank the operational ranks in a manner reflecting the actual records of ranking in the past with respect to the data item.

The processing illustrated by the flowchart (steps S89a to S89u) in FIGS. 25 and 26 can be the processing in the step S85, or processing in a step S109 in FIG. 28, referred to hereinafter, depending on data to be processed (data acquired in the step S89b).

In other words, the processing in the step S89, the processing in the step S85, and the processing in the step S109 are realized by the same algorithm illustrated in FIGS. 25 and 26.

Specifically, the processing in the step S89 is performed as described above. The processing in the step S85 is the processing in the step S89b which is performed on the history information in the past other than the history information of today (today operational ranks) stored in the access information storage section 116. Further, the processing in the step 109 in FIG. 28, referred to hereinafter, is the processing in the step S89b which is performed on a schedule (one set of operational ranks for one day) set by the user, or a schedule in the past.

Next, a description will be given of the schedule adjustment process.

<Schedule Adjustment Process>

For example, when there is a schedule (one set of operational ranks for one day) set by the user, the schedule adjustment process is performed for adjusting the schedule (operational ranks) by taking the schedule set by the user into account. The user can input the schedules via an interface (not illustrated).

FIG. 27 illustrates an example of the schedule set by the user.

The schedule set by the user is stored in the memory 13 in a format similar to that of the schedule management table 117a as illustrated in FIG. 27.

Figure 28:
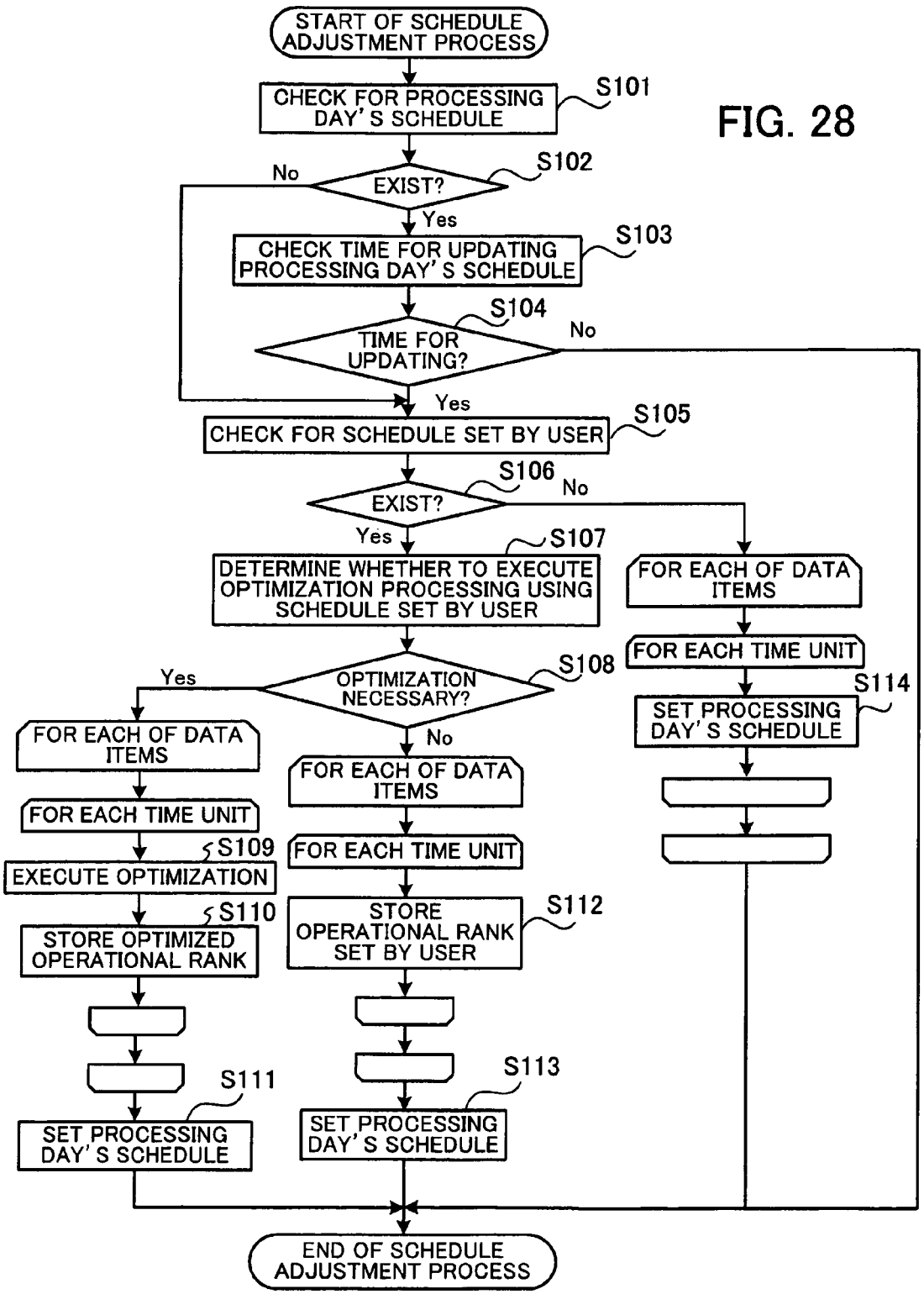
FIG. 28 is a flowchart of a schedule adjustment process.

FIG. 28 is a flowchart of the schedule adjustment process.

(Step S101) The schedule adjustment section 115d checks on a schedule in the column of today operational rank in the schedule management table 117a (hereinafter also referred to as the "processing day's schedule"). Then, the process proceeds to a step S102.

(Step S102) The schedule adjustment section 115d determines based on a result of the check in the step S101 whether or not there is a processing day's schedule in the schedule management table 117a. If there is a processing day's schedule in the schedule management table 117a (YES to the step S102), the process proceeds to a step S103, whereas if not (NO to the step S102), the process proceeds to a step S105. It should be noted that if it is determined that there is no processing day's schedule, the schedule management and change section 115c holds the column of today operational rank in its no-information state without setting any information therein.

(Step S103) The schedule adjustment section 115d checks a time to update the processing day's schedule.

(Step S104) The schedule adjustment section 115d determines based on a result of the check in the step S103 whether or not the current time point is a time to update the processing day's schedule. If the current time point is a time to update the processing day's schedule (YES to the step S104), the process proceeds to the step S105, whereas if not (NO to the step S104), the schedule adjustment section 115d terminates the schedule adjustment process.

(Step S105) The schedule adjustment section 115d checks on a schedule set by the user (see FIG. 27). Then, the process proceeds to a step S106.

(Step S106) The schedule adjustment section 115d determines based on a result of the check in the step S105 whether or not there is a schedule set by the user in the memory 13. If there is a schedule set by the user (YES to the step S106), the process proceeds to a step S107.

On the other hand, if there is no schedule set by the user (NO to the step S106), the process proceeds to a step S114. In this case, the schedule management and change section 115c repeatedly executes the step S114 for each target data item for each unit of time (every 30 minutes).

(Step S107) The schedule adjustment section 115d determines whether or not to perform optimization processing using the schedule set by the user. The storage system 100 according to the present embodiment is configured such that when the user adjusts the schedule that determine the contents of the memory 13, via an interface (not illustrated), it is possible to set, in the controller 115 of the CPUs 11 and 12, priority information indicative of whether to give priority to the schedule set by the user (i.e. to use the schedule set by the user as a schedule without adjusting the same) or to give priority to one or both of the schedule set by the user and the schedule (history information) in the past associated with the schedule set by the user (i.e. to execute the optimization processing using one or both of the schedule set by the user and the associated schedule in the past).

(Step S108) The schedule management and change section 115c determines based on the priority information set by the user whether or not the optimization processing is necessary. If the optimization processing is necessary (YES to the step S108), the process proceeds to the step S109. In this case, the schedule management and change section 115c executes the following steps S109 and S110 on each target data item for each time unit (corresponding to each time zone mentioned hereinabove).

If the optimization processing is not necessary (NO to the step S108), the process proceeds to a step S112.

In this case, the schedule management and change section 115c executes the step S112 on each target data item for each time unit (corresponding to each time zone mentioned hereinabove).

(Step S109) The schedule adjustment section 115d performs optimization of the processing day's schedule based on the schedule set by the user. At this time, the schedule management and change section 115c executes the optimization processing by the processing procedure (algorithm) illustrated in FIG. 26. Specifically, the schedule management and change section 115c acquires the present schedule (present operational ranks) and the schedule set by the user (operational ranks set by the user) one example of which is illustrated in FIG. 27, in the step S89b in FIG. 25, and executes the processing in the following steps S89c to S89u in FIGS. 25 and 26 on each pair of an operational rank in the acquired processing day's schedule and an operational rank in the schedule set by the user for each time zone (time unit). Then the process proceeds to the step S110.

(Step S110) After thus totalizing the present schedule and the schedule set by the user to thereby optimize the processing day's schedule (processing day's schedule) in the step S109, and then the schedule adjustment section 115d temporarily stores the optimized schedule (i.e. "operational rank") in the memory 13.

After the schedule adjustment section 115d executes the processing in the steps S109 and S110 for each target data item for each time unit, the process proceeds to a step S111.

(Step S111) The schedule adjustment section 115d stores the processing day's schedule, which has been temporarily stored in the memory 13 in the step S110, in the column of today operational rank of the schedule management table 117a. After that, the schedule adjustment section 115d terminates the schedule adjustment process.

(Step S112) The schedule adjustment section 115d temporarily stores the schedule set by the user in the memory 13.

The schedule adjustment section 115d executes the step S112 on each data item for each unit time unit (corresponding to each time zone mentioned hereinabove), and then the process proceeds to a step S113.

(Step S113) The schedule adjustment section 115d stores the schedule set by the user, which has been temporarily stored in the memory 13 in the step S112, in the column of today operational rank of the schedule adjustment management table 117b. Then, the schedule adjustment section 115d terminates the schedule adjustment process.

(Step S114) The schedule adjustment section 115d sets an existing processing day's operational rank of a target data item as an associated operational rank of a schedule for the processing day, as it is, for a predetermined time zone (unit of 30 minutes).

After the schedule adjustment section 115d executes the step S114 for each of the target data items for each of predetermined time zones of a half day, the schedule adjustment process is terminated.

As described above, when there is a schedule set by the user, and at the same time the user has instructed optimization of the processing day's schedule, the schedule adjustment section 115d optimizes the processing day's schedule by integrating the processing day's schedule (processing day's operational ranks) generated based on the history information and the schedule set by the user. This makes it possible to set the processing day's schedule that meets both user's intention and the past tendency, whereby it is possible to use the memory 13 more effectively.

Further, the processing day's schedule can be changed to the schedule set by the user according to the setting configured by the user, which enhances user convenience.

As described heretofore, according to the storage system 100, the SSD write controller 115a is configured to determine in the SSD write control process whether to write data in an SSD RAID group or save the data in a pool area according to an operational rank assigned thereto. This makes it possible to prevent data from being written in the SSD RAID group with high frequency to thereby prevent the SSD RAID group from reaching the upper limit of the number of times of rewriting that can be executed, earlier than it ought to be. Therefore, it is possible to enhance the reliability of the storage system 100.

Further, since the update process is performed, it is possible to control the SSD write control process more accurately according to the access statuses.

Although in the present embodiment, the schedule adjustment management table 117b having operational ranks set therein on a RLU-by-RLU basis is generated, this is not limitative, but the schedule adjustment management table 117b may be replaced by a schedule adjustment management table having operational ranks set therein on a data item-by-data item basis.

FIG. 29 illustrates the schedule adjustment management table in which operational ranks are set on a data item-by-data item basis.

The schedule adjustment management table 117c is provided on a day-by-day basis.

The schedule adjustment management table 117c includes columns of time, operational rank of Data 1, operational rank of Data 2 . . . , operational rank of Data n. Items of information arranged in a row in the schedule adjustment management table 117c are associated with each other.

In the column of time, time periods are set in the same time units as in the access history management table 116b.

The column of the operational ranks of each data item collectively stores operational ranks generated based on renewal operational ranks in the respective schedule management tables 117a by taking into account the operational ranks set by the user.

Also by using the schedule adjustment management table 117c configured as above, it is possible to obtain the same advantageous effects as provided by the schedule adjustment management table 117b.

Next, a storage system according to a third embodiment will be described.

(c) Third Embodiment

In the following, a description will be mainly given of different points of the storage system according to the third embodiment from the above-described second embodiment, and description of elements identical or similar to those described in the second embodiment is omitted.

The storage system according to the third embodiment executes the same processes as those of the second embodiment except for the access count and history management process.

In the access count and history management process according to the third embodiment, a history information check process and an SSD rank correction process as described hereinafter are executed in the step S76, whereby operational ranks are determined and stored.

Hereinafter, these processes are described in the mentioned order.

<History Information Check Process>

Figure 30:
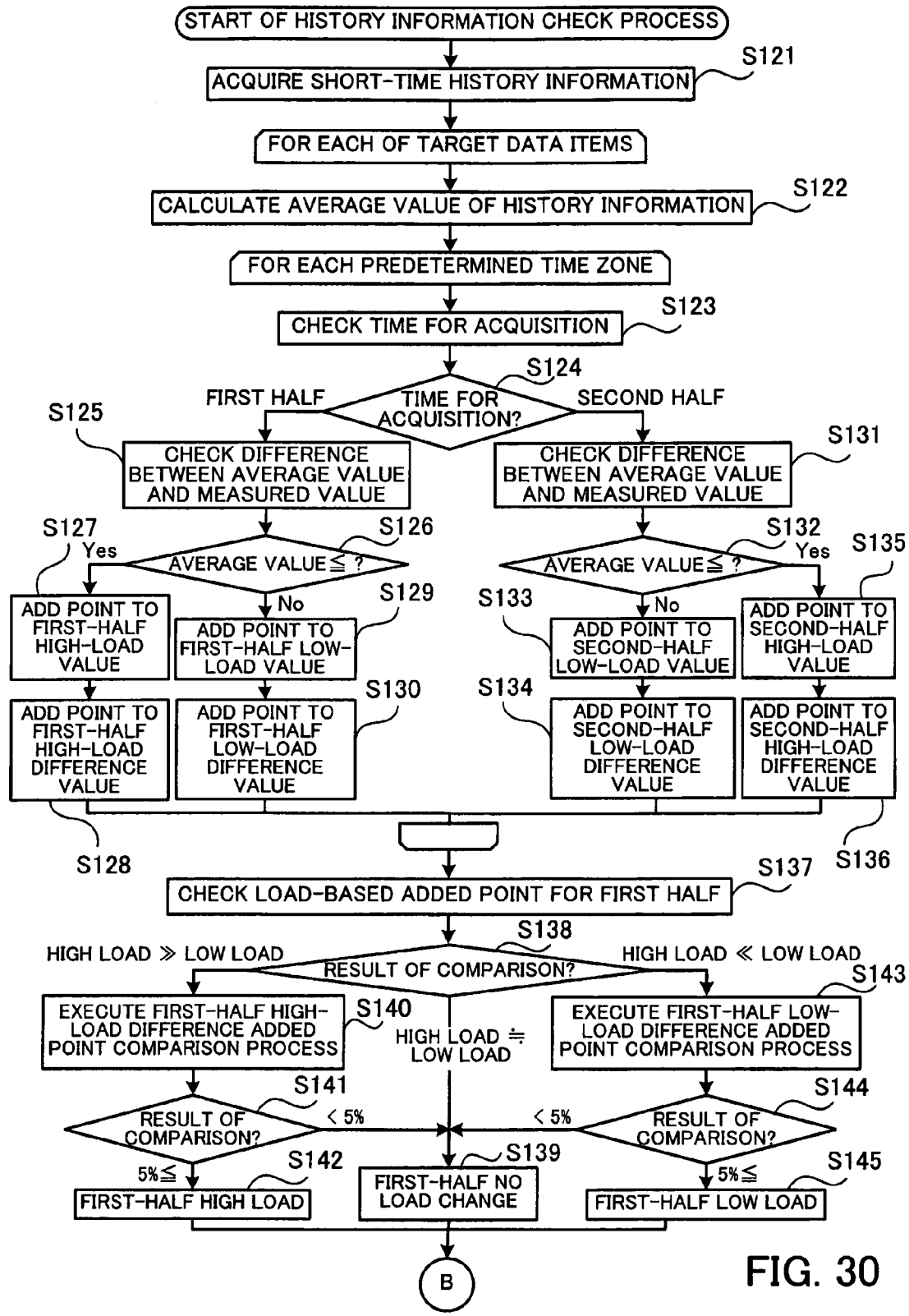
FIG. 30 is a flowchart of a history information check process.
Figure 31:
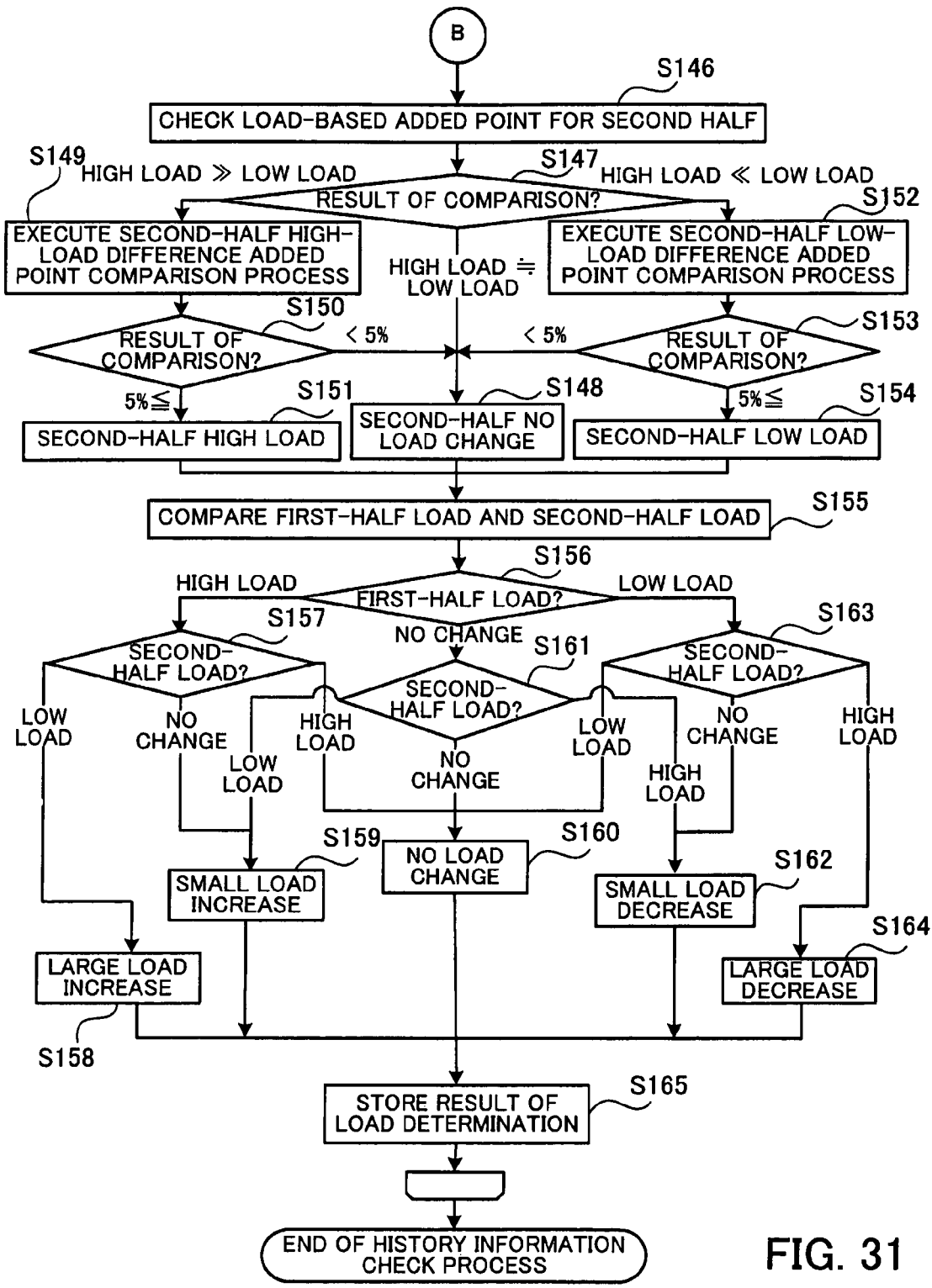
FIG. 31 is a continuation of FIG. 30.

FIGS. 30 and 31 are flowcharts of the history information check process.

(Step S121) The access monitor and history management section 115b acquires access counts stored in the access frequency management table 116a at intervals of a predetermined time period (one minute) for a predetermined time period (30 minutes in the present embodiment) as immediately preceding short-time history information. Then, the process proceeds to a step S122.

The access monitor and history management section 115b executes the following steps S122 to S165, referred to hereinafter, on all target data items.

(Step S122) The access monitor and history management section 115b calculates a per-minute average value (hereinafter referred to as the "load average value") of the immediately preceding 30-minute history information acquired in the step S121. Then, the process proceeds to a step S123.

The access monitor and history management section 115*b* executes processing in the following steps S123 to S136 on each of all the per-minute access counts (i.e. 30 items of history information).

(Step S123) The access monitor and history management section 115*b* checks a per-minute access count, and then the process proceeds to a step S124.

(Step S124) The access monitor and history management section 115*b* determines based on a result of the check in the step S123 whether the per-minute access count belongs to a first half or a second half of a 30-minute time period required for acquisition.

The access monitor and history management section 115*b* determines that an access count for the latest 15-minute time period closer to the current time point belong to the first half, and an access count for the preceding 15-minute time period of the 30-minute time period belongs to the second half.

If the access count belongs to the first half (first half in the step S124), the process proceeds to a step S125, whereas if the access count belongs to the second half (second half in the step S124), the process proceeds to a step S131.

(Step S125) The access monitor and history management section 115*b* checks the difference between the load average value and the access count (measured value) in the first half, and then the process proceeds to a step S126.

(Step S126) The access monitor and history management section 115*b* determines based on a result of the check in the step S125 whether or not the measured value is not smaller than the average value. If the measured value is not smaller than the average value (YES to the step 126), the process proceeds to a step S127, whereas if not (NO to the step 126), the process proceeds to a step S129.

(Step S127) The access monitor and history management section 115*b* adds one point to a first-half high-load value (initial value=0) indicating that the first half has a high-load tendency (tendency to increase in the access frequency), and then the process proceeds to a step S128.

(Step S128) The access monitor and history management section 115*b* adds the difference (absolute value) between the measured value and the average value calculated in the step S125 to a first-half high-load difference value (initial value=0) indicating a total value of high-load difference values in the first half. Then, the process proceeds to a step S137.

(Step S129) The access monitor and history management section 115*b* adds one point to a first-half low-load value (initial value=0) indicating that the first half has a low-load tendency (tendency to decrease in the access frequency), and then the process proceeds to a step S130.

(Step S130) The access monitor and history management section 115*b* adds the difference (absolute value) between the measured value and the average value calculated in the step S125 to a first-half low-load difference value (initial value=0) indicating a total value of low-load difference values in the first half. Then, the process proceeds to the step S137.

(Step S131) The access monitor and history management section 115*b* checks the difference between the load average value and the access count in the second half, and then the process proceeds to a step S132.

(Step S132) The access monitor and history management section 115*b* determines based on a result of the check in the step S131 whether or not the measured value is not smaller than the average value. If the measured value is not smaller than the average value (YES to the step 132), the process proceeds to a step S135, whereas if not (NO to the step 132), the process proceeds to a step S133.

(Step S133) The access monitor and history management section 115*b* adds one point to a second-half low-load value (initial value=0) indicating that the second half has a low-load tendency (tendency to decrease in the access frequency), and then the process proceeds to a step S134.

(Step S134) The access monitor and history management section 115*b* adds the difference (absolute value) between the measured value and the average value calculated in the step S131 to a second-half low-load difference value (initial value=0) indicating a total value of low-load difference values in the second half. Then, the process proceeds to the step S137.

(Step S135) The access monitor and history management section 115*b* adds one point to a second-half high-load value (initial value=0) indicating that the second half has a high-load tendency (tendency to increase in the access frequency), and then the process proceeds to a step S136.

(Step S136) The access monitor and history management section 115*b* adds the difference (absolute value) between the measured value and the average value calculated in the step S131 to a second-half high-load difference value (initial value=0) indicating a total value of high-load difference values in the second half. Then, the process proceeds, to the step S137.

(Step S137) After executing the steps S123 to S136 on all the per-minute access counts for the immediately preceding 30 minutes, the access monitor and history management section 115*b* checks a load-based added point for the first half. More specifically, the access monitor and history management section 115*b* compares the first-half high-load value calculated in the step S127 and the first-half low-load value calculated in the step S129. Then, the process proceeds to a step S138.

(Step S138) The access monitor and history management section 115*b* determines whether the first half has the high-load tendency or the low-load tendency. Here, if the difference between the first-half high-load value and the first-half low-load value is smaller than ¼ of the number of samples (i.e. 3.75 which is ¼ of 15 as the number of data items acquired in the 15-minute first half, in the illustrated example), the access monitor and history management section 115*b* determines that the first-half high-load value and the first-half low-load value are substantially equal to each other ("HIGH LOAD≈LOW LOAD" in the step S138), and the process proceeds to the step S139.

Further, if the first-half high-load value is larger than the first-half low-load value by 4 or more, the access monitor and history management section 115*b* determines that the first half can be high load ("HIGH LOAD>>LOW LOAD" in the step S138), and then the process proceeds to a step S140.

Further, if the first-half low-load value is larger than the first-half high-load value by 4 or more, the access monitor and history management section 115*b* determines that the first half can be low load ("HIGH LOAD<<LOW LOAD" in the step S138), and then the process proceeds to a step S143.

(Step S139) The access monitor and history management section 115*b* determines that there is no load change (increase/decrease tendency) in the first half, and then the process proceeds to a step S146.

(Step S140) The access monitor and history management section 115*b* executes a first-half high-load difference added point comparison process for calculating the difference between the load average value and an averaged value of the first-half high-load difference value (i.e. a value obtained by dividing the first-half high-load difference value by the first-half high-load value (the number of samples determined to be "not smaller" (high load)) in the step S126). After that, the process proceeds to a step S141.

(Step S141) The access monitor and history management section 115b determines based on a result of the comparison in the step S140 whether or not the calculated difference is smaller than 5% of the averaged value. If the calculated difference is smaller than 5% of the averaged value ("smaller than 5%" in the step S141), the process proceeds to the step S139, whereas if the calculated difference is not smaller than 5% of the averaged value ("not smaller than 5%" in the step S141), the process proceeds to a step S142.

(Step S142) The access monitor and history management section 115b determines that the first half has a high-load tendency (increasing tendency; first-half high load), and then the process proceeds to the step S146.

(Step S143) The access monitor and history management section 115b executes a first-half low-load difference added point comparison process for calculating the difference between the load average value and an averaged value of the first-half low-load difference value (i.e. a value obtained by dividing the first-half low-load difference value by the first-half low-load value (the number of samples determined to be "smaller" (low load)) in the step S126).

(Step S144) The access monitor and history management section 115b determines based on a result of the comparison in the step S143 whether or not the calculated difference is smaller than 5% of the averaged value. If the calculated difference is smaller than 5% of the averaged value ("smaller than 5%" in the step S144), the process proceeds to the step S139, whereas if the calculated difference is not smaller than 5% of the averaged value ("not smaller than 5%" in the step S144), the process proceeds to a step S145.

(Step S145) The access monitor and history management section 115b determines that the first half has a low-load tendency (decreasing tendency; first-half low load), and then the process proceeds to the step S146.

(Step S146) The access monitor and history management section 115b executes the same processing as the processing executed on the first half in the steps S137 to S145 also on the second half.

The steps S137 to S145 and the steps S146 to S154 correspond to each other, and the steps S146 to S154 are distinguished from corresponding ones of the steps S137 to S145 only in that data items to be processed are the second-half low-load value, the second-half high-load value, the second-half low-load difference value, and the second-half high-load difference value. Therefore, a detailed description of the steps S147 to S154 is omitted.

(Step S155) After determining, as to the second half, no load change in the second half (step 148), a second-half high load (step S151) or a second half low load (step S154), the access monitor and history management section 115b compares the load tendency of the first half (first-half load) and that of the second half (second-half load). Then, the process proceeds to a step S156.

(Step S156) With reference to the comparison in the step S155, the access monitor and history management section 115b determines how the first-half load has been determined in one of the steps S139, S142, and S145.

Here, when the access monitor and history management section 115b determines that the first-half load is high ("high load" in the step S156), the process proceeds to a step S157.

Further, when the access monitor and history management section 115b determines that there is no change in the first-half load ("no change" in the step S156), the process proceeds to a step S161.

Further, when the access monitor and history management section 115b determines that the first-half load is low ("low load" in the step s156), the process proceeds to a step S163.

(Step S157) With reference to the result of the determination in the associated one of the steps S148, S151, and S154, the access monitor and history management section 115b determines how the second-half load has been determined. When the access monitor and history management section 115b determines that the second-half load is inversely low ("low load" in the step S157), the process proceeds to a step S158. When the access monitor and history management section 115b determines that there is no change in the second-half load ("no change" in the step S157), the process proceeds to a step S159.

Furthermore, when the access monitor and history management section 115b determines that the second-half load as well is high ("high load" in the step s157), the process proceeds to a step S160.

(Step S158) The access monitor and history management section 115b determines that immediately preceding access exhibits a strong tendency to increase (large load increase). After that, the process proceeds to a step S165.

(Step S159) The access monitor and history management section 115b determines that the immediately preceding access exhibits a weak tendency to increase (small load increase). After that, the process proceeds to the step S165.

(Step S160) The access monitor and history management section 115b determines that the immediately preceding access exhibits neither increasing nor decreasing tendency (no load change). After that, the process proceeds to the step S165.

(Step S161) The access monitor and history management section 115b determines the tendency of the second-half load. Here, if the access monitor and history management section 115b determines that the second-half load is low ("low load" in the step S161), the process proceeds to the step S159.

Further, when the access monitor and history management section 115b determines that there is no change in the second-half load, the process proceeds to the above-mentioned step S160.

Further, when the access monitor and history management section 115b determines that the second-half load is high ("high load" in the step S161), the process proceeds to a step S162.

(Step S162) The access monitor and history management section 115b determines that the immediately preceding access exhibits a weak tendency to decrease (small load decrease). After that, the process proceeds to the step S165.

(Step S163) When the access monitor and history management section 115b determines that the second-half load is low ("low load" in the step S163), the process proceeds to the step S160.

On the other hand, when the access monitor and history management section 115b determines that there is no change in the second-half load ("no change" in the step S163), the process proceeds to the step S162.

Further, when the access monitor and history management section 115b determines that the second-half load is high ("high load" in the step S163), the process proceeds to a step S164.

(Step S164) The access monitor and history management section 115b determines that the immediately preceding access exhibits a strong tendency to decrease (large load decrease). After that, the process proceeds to the step S165.

(Step S165) The access monitor and history management section 115b stores the result of the above-described load determination in the memory 13.

After the access monitor and history management section 115b executes the processing in the steps S123 to S165 on all the target data items, the history information check process is terminated.

As described hereinabove, in storing the operational ranks in the access history management table 116b, the access monitor and history management section 115b determines the tendency of immediately preceding access based on the immediately preceding access count (history) collected after generation of an associated schedule before the start of the update process using the schedule.

In doing this, the access monitor and history management section 115b divides the immediately preceding access count collected for a predetermined time period into a first half and a second half, determines the tendency of an increase or decrease in the access count of each half, and compares the tendency of an increase or decrease in the access count in the first half and the tendency of increase or decrease in the access count in the second half, to thereby determine the tendency of the immediately preceding accesses. This enables the determination to be performed with accuracy.

Further, the increasing or decreasing tendency of the access count is determined not only comparing the magnitudes (the first-half high-load value, the first-half low-load value, the second-half high-load value, and the second-half low-load value) of the access frequency with respect to the load average value (steps S138 and S147), but based on the actual difference values (the first-half high-load difference value, the first-half low-load difference value, the second-half high-load difference value, and the second-half low-load difference value) with respect to the load average value. Therefore, it is possible to determine the tendency of immediately preceding access more accurately.

Further, in doing this, if the difference between the averaged value of each difference value and the load average value is smaller than 5% ("smaller than 5%" in the step S141, S144, S150, or S153), the access monitor and history management section 115b determines that there is no load change (in the step S139 or S148), and hence even in a case where a high-load tendency or a low-load tendency can be determined based on the load value, the access monitor and history management section 115b determines that there is no change if there is almost no actual difference value. This makes it possible to more accurately determine the tendency of increase or decrease in the access count.

Next, the SSD rank correction process will be described.
<SSD Rank Correction Process>

Figure 32:
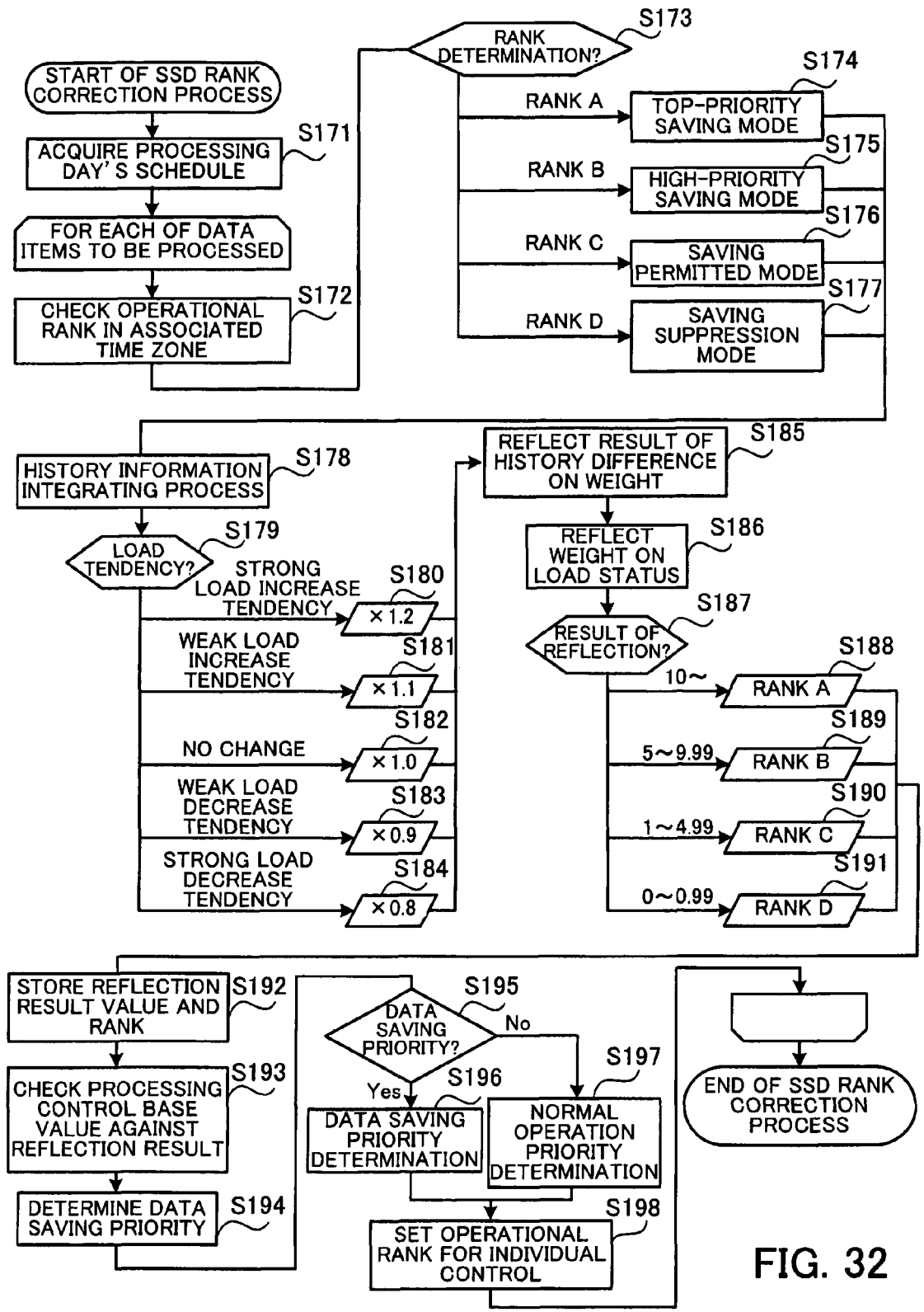
FIG. 32 is a flowchart of an SSD rank correction process.

FIG. 32 is a flowchart of the SSD rank correction process. In FIG. 32, an operational rank is simply denoted by "rank".

(Step S171) The schedule management and change section 115c acquires the processing day's schedule of the schedule adjustment section 115d, and then executes steps S172 to 198 on each data item to be processed.

(Step S172) The schedule management and change section 115c confirms an operational rank in an associated time zone in the acquired processing day's schedule. Then, the process proceeds to a step S173.

(Step S173) The schedule management and change section 115c sets a base value of each operational rank used in a step S174 et seq. for data load control based on the operational rank checked in the step S172. Specifically, when the operational rank is A ("rank A" in the step S173), the process proceeds to a step S174. When the operational rank is B ("rank B" in the step S173), the process proceeds to a step S175. When the operational rank is C ("rank C" in the step S173), the process proceeds to a step S176. When the operational rank is D ("rank D" in the step S173), the process proceeds to a step S177.

(Step S174) The schedule management and change section 115c determines that the operational rank confirmed in the step S172 is a top-priority saving mode, and then the process proceeds to the step S178.

(Step S175) The schedule management and change section 115c determines that the operational rank confirmed in the step S172 is a high-priority saving mode, and then the process proceeds to the step S178.

(Step S176) The schedule management and change section 115c determines that the operational rank confirmed in the step S172 is a saving permitted mode, and then the process proceeds to the step S178.

(Step S177) The schedule management and change section 115c determines that the operational rank confirmed in the step S172 is a saving suppression mode, and then the process proceeds to a step S178.

(Step S178) The schedule management and change section 115c starts a process for determining an operational rank for an actual data loading control process based on information indicative of the tendency of access (tendency of load) acquired by the history information check process illustrated in FIGS. 30 and 31, as a history information integrating process.

(Step S179) The schedule management and change section 115c checks the tendency of the load of the data item (the result of the load determination stored in the step S165 in FIG. 31). If the load tendency of the data item is a strong load increase tendency ("strong load increase tendency" in the step S179), the process proceeds to a step S180. If the load tendency of the data item is a weak load increase tendency ("weak load increase tendency" in the step S179), the process proceeds to a step S181. If there is no change in the tendency of load ("no change" in the step S179), the process proceeds to a step S182. If the load tendency of the data item is a weak load decrease tendency ("weak load decrease tendency" in the step S179), the process proceeds to a step S183. If the load tendency of the data item is a strong load decrease tendency ("strong load decrease tendency" in the step S179), the process proceeds to a step S184.

(Step S180) The schedule management and change section 115c calculates a correction weight by multiplying a weight reference value (e.g. 1) set in advance by 1.2, and then the process proceeds to a step S185.

(Step S181) The schedule management and change section 115c calculates a correction weight by multiplying the weight reference value by 1.1, and then the process proceeds to a step S185.

(Step S182) The schedule management and change section 115c calculates a correction weight by multiplying the weight reference value by 1.0, and then the process proceeds to a step S185.

(Step S183) The schedule management and change section 115c calculates a correction weight by multiplying the weight reference value by 0.9, and then the process proceeds to a step S185.

(Step S184) The schedule management and change section 115c calculates a correction weight by multiplying the weight reference value by 0.8, and then the process proceeds to a step S185.

(Step S185) The schedule management and change section 115c causes the first-half high-load difference value or the first-half low-load difference value as the difference in the history information calculated in the step S128 or S130 in FIG. 30 to be reflected on the correction weight. Specifically, the schedule management and change section 115c performs calculation using the following equation (4):

$$\text{correction weight} + (\text{difference}/100) \quad (4)$$

Here, if the result of the check in the step S179 indicates a strong load increase tendency or a weak load increase tendency, the schedule management and change section 115c employs the first-half high-load difference value calculated in the step S128 in FIG. 30 as a value of the difference in the above-mentioned equation (4). At this time, the schedule management and change section 115c directly employs the first-half high-load difference value as a positive value for the difference.

On the other hand, the result of the check in the step S179 indicates a weak load decrease tendency or a strong load decrease tendency, the schedule management and change section 115c employs the first-half low-load difference value calculated in the step S130 in FIG. 30 as a value of the difference in the above-mentioned equation (4).

At this time, the schedule management and change section 115c employs the first-half low-load difference value as a negative value for the difference.

Further, the result of the check in the step S179 indicates no load change, the schedule management and change section 115c employs 0 as a value of the difference. After that, the process proceeds to a step S186.

(Step S186) The schedule management and change section 115c causes the value of the correction weight to be reflected on the load average value of the history information calculated in the step S122 in FIG. 30. Specifically, the schedule management and change section 115c multiplies the load average value by the correction weight having been subjected to the processing in the step S185. Then, the process proceeds to a step S187.

(Step S187) The schedule management and change section 115c judges a result of the reflection in the step S186. If the result of the reflection (i.e. the result of the processing in the step S186) is 10 or more ("10~" in the step S187), the process proceeds to a step S188.

Further, if the result of the reflection is not smaller than 5 and not larger than 9.99 ("5~9.99" in the step S187), the process proceeds to a step S189. If the result of the reflection is not smaller than 1 and not larger than 4.99 ("1~4.99" in the step S187), the process proceeds to a step S190. If the result of the reflection is not smaller than 0 and not larger than 0.99 ("0~0.99" in the step S187), the process proceeds to a step S191.

(Step S188) The schedule management and change section 115c determines that the correction operational rank for correcting the data item is the operational rank A, and then the process proceeds to a step S192.

(Step S189) The schedule management and change section 115c determines that the correction operational rank for correcting the data item is the operational rank B, and then the process proceeds to a step S192.

(Step S190) The schedule management and change section 115c determines that the correction operational rank for correcting the data item is the operational rank C, and then the process proceeds to a step S192.

(Step S191) The schedule management and change section 115c determines that the correction operational rank for correcting the data item is the operational rank D, and then the process proceeds to the step S192.

These operational ranks A to D are similar in meaning to the operational ranks in a schedule as priorities. The result of the reflection represents a 30-minute average value (per-minute value), and hence it is possible to perform ranking to the same effects based on the branching conditions applied in the step S187.

(Step S192) The schedule management and change section 115c stores a value indicative of the result of the reflection and the correction operational rank in the memory 13, and then the process proceeds to a step S193.

(Step S193) The schedule management and change section 115c checks the operational rank as a base value, which is the result of the determination in the step S173, against the correction operational rank (the result of the reflection). Specifically, the schedule management and change section 115c calculates average values by digitizing the operational ranks as the base values and the correction operational ranks, respectively. In the illustrated example, by setting the operational rank A to 1, the operational rank B to 2, the operational rank C to 3, and the operational rank D to 4, each operational rank as the base value and each correction operational rank are digitized, respectively, to calculate the average values of the two kinds of values. Then, the process proceeds to a step S194.

(Step S194) The schedule management and change section 115c starts a data saving priority determination process using the average value calculated in the step S193.

(Step S195) The schedule management and change section 115c determines whether the mode determined in the step S173 is one for saving on a priority basis. If the mode is the top-priority saving mode or the high-priority saving mode (YES to the step S195), the process proceeds to a step S196. If the mode is the saving-permitted mode or the saving suppression mode (NO to the step S195), the process proceeds to a step S197.

(Step S196) As a data saving priority determination process, the schedule management and change section 115c performs a process for determining the final operational rank of the data to be processed based on a value obtained by discarding the fractional part of the average value calculated in the step S193.

For example, when the average value is 1.5, the schedule management and change section 115c discards 0.5 of the average value to treat the average value as 1.0. The average value is ranked using the average value obtained by digitizing the operational rank in the step S193.

Specifically, the schedule management and change section 115c determines the operational rank as A if the average value is 1, as B if the average value is 2, as C if the average value is 3, and as D if the average value is 4. After that, the process proceeds to a step S198.

As described above, when the operation mode is a priority data saving mode, the schedule management and change section 115c minimizes the average value by discarding the fractional part of the average value to thereby enhance the final priority of the data to be processed.

(Step S197) As a normal operation priority determination process, the schedule management and change section 115c performs a process for determining the final operational rank of the data to be processed, based on a value obtained by rounding up the fractional part of the average value calculated in the step S193.

For example, when the average value is 1.5, the schedule management and change section 115c rounds up 0.5 of the average value to treat the average value as 2.0, and ranks the average value similarly to the processing in the step S196. Then, the process proceeds to a step S198.

As described above, when the normal operation is performed on a priority basis, the schedule management and change section 115c rounds up the fractional part of the average value to thereby normally treat the average value and determine the final priority of the data.

(Step S198) The schedule management and change section 115c sets the operational rank determined in the step S196 or S197 as an individual control operational rank (operational rank), which is the final operational rank, in the column of operational rank of the access history management table 116b.

The schedule management and change section 115c executes the above-described steps S172 to S198 on each of data items to be processed, which are acquired in the step 171 for the processing day, followed by terminating the SSD rank correction process.

According to the storage system of the third embodiment, it is possible to obtain the same advantageous effect as provided by the storage system 100 of the second embodiment.

Further, according to the storage system of the third embodiment, the schedule management and change section 115c is capable of reliably correcting a schedule before performing the data loading control process, based on the immediately preceding access tendency, in a manner adapted to the access tendency. In short, the schedule management and change section 115c is capable of dynamically changing the schedule based on the immediately preceding access tendency. Therefore, even in a case where the access tendency changes after determination of the schedule, if the SSD write control process is performed based on the corrected access tendency, it is possible to make effective use of the memory 13.

All the values used in the steps in FIGS. 30 and 31 should not be deemed to limit the present invention, but they can be changed or modified, without departing from scope of the intended processing in FIGS. 30 and 31.

Although the storage control program and method, and the storage control device according to the present invention have been described based on the embodiments illustrated in the drawings, this is not limitative, but the configuration of each section can be replaced by a desired configuration having similar functions. Further, any other desired construction or processes may be added to the present invention.

Further, the present invention may be constructed by a combination of not less than two desired configurations (features) of the above-described embodiments.

It should be noted that it is possible to realize the above-described function of processing by a computer. In this case, a program in which content of processing of function to be included in the control module 10a is written is provided. By carrying out the program by the computer, the above-described function of processing is realized on the computer. The program in which the content of processing is written can be recorded in a storage medium which is capable of being read by the computer. Examples of the storage medium which is capable of being read by the computer include a magnetic recording system, an optical disk, a magnetooptical medium, a semiconductor memory or the like. Examples of the magnetic recording system include a hard disk device (HDD), a flexible disk (FD), a magnetic tape. Examples of the optical disk include a DVD (Digital Versatile Disc), a DVD-RAM (Random Access Memory), a CD-ROM/RW (Compact Disc Read Only Memory/(ReWritable). Examples of the magnetooptical medium include an MO (Magneto-Optical disc).

In case of distributing programs, for example, portable record media, such as DVD, CD-ROM or the like in which the program is recorded are marketed. Further, it is also possible to store the program in a storing device of a server computer, and transfer the program from the server computer to the other computer via a network.

The computer which carries out the program stores, for example, the program which is recorded in the portable record medium, or is transferred from the server computer in the storing device thereof. Then, the computer reads out the program from the storing device thereof, and carries out the processes according to the program. It should be noted that the computer is also capable of directly reading out the program from the portable record medium, and carrying out the processes according to the program. Further, the computer is also capable of carrying out the processes according to the program which is received, each time the program is transferred from the server computer connected via a network.

Further, at least part of the above-described function of processing can be realized by an electronic circuit, such as DSP (Digital Signal Processor), ASIC (Application Specific Integrated Circuit), PLD (Programmable Logic Device), or the like.

According to the storage control program disclosed herein, it is possible to enhance the reliability of the data management.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A non-transitory computer-readable medium storing a storage control program for causing a computer to execute:
   generating access frequency information for identifying an access frequency of each data item transmitted from a host apparatus according to a status of write access of the data item to the storage medium;
   determining whether to write a data item saved in a saving area provided for saving data, into the storage medium, or to hold a state of the data item saved in the saving area, based on the generated access frequency information; and
   writing the data item saved in the saving area into the storage medium according to the determination.

2. The non-transitory computer-readable medium according to claim 1, wherein criteria for writing a data item in the storage medium according to the access frequency thereof to the storage medium are set stepwise in the access frequency information, such that at a lowest level of the access frequency, the data item saved in the saving area is written into the storage medium.

3. The non-transitory computer-readable medium according to claim 2, wherein at a level other than the lowest level of the access frequency to the storage medium, if there is no access to the storage medium for a predetermined time period, it is determined that the data item saved in the saving area is to be written into the storage medium.

4. The non-transitory computer-readable medium according to claim 2, wherein at a highest level of the access frequency to the storage medium, the data item saved in the saving area is held in a state saved in the saving area.

5. The non-transitory computer-readable medium according to claim 1, wherein in said determining, when a remaining capacity of the saving area is smaller than an amount of a data item to be saved, said determining writes the data item in the storage medium irrespective of the access frequency.

6. The non-transitory computer-readable medium according to claim 1, wherein in response to a request made by the host apparatus for reading a data item, the storage control program causes the computer to execute a data read determination process for determining whether or not the data item exists in the saving area before determining whether or not the data item exists in the storage medium.

7. The non-transitory computer-readable medium according to claim 6, wherein in said data read determination process, if the data item exists in the saving area, the storage control program causes the computer to execute determining whether all of the data item exists or part of the data item exists, and if the part of the data item exists, the storage control program causes the computer to execute reading data saved in the saving area and data stored in the storage medium.

8. A storage control method comprising:
   generating access frequency information for identifying an access frequency of each data item transmitted from a host apparatus according to a status of write access of the data item to a storage medium;
   determining whether to write a data item saved in a saving area provided for saving data, into the storage medium, or to hold a state of the data item saved in the saving area, based on the generated access frequency information; and
   writing the data item saved in the saving area into the storage medium according to the determination.

9. A storage control device comprising:
   a generation section configured to generate access frequency information for identifying an access frequency of each data item transmitted from a host apparatus according to a status of write access of the data item to a storage medium;
   a determination section configured to determine whether to write a data item saved in a saving area provided for saving data, into the storage medium, or to hold a state of the data item saved in the saving area, based on the access frequency information generated by said generation section; and
   a write section configured to write the data item saved in the saving area into the storage medium according to the determination made by said determination section.

* * * * *